(12) United States Patent
Olson et al.

(10) Patent No.: US 11,876,732 B2
(45) Date of Patent: Jan. 16, 2024

(54) METHOD FOR MANAGING THE CONFIGURATION OF ACCESS TO PERIPHERALS AND THEIR ASSOCIATED RESOURCES OF A SYSTEM ON CHIP, AND CORRESPONDING SYSTEM ON CHIP

(71) Applicants: STMicroelectronics (Rousset) SAS, Rousset (FR); STMicroelectronics (Alps) SAS, Grenoble (FR); STMicroelectronics (Grand Ouest) SAS, Le Mans (FR)

(72) Inventors: Daniel Olson, Marseilles (FR); Loic Pallardy, Rouillon (FR); Nicolas Anquet, Grenoble (FR)

(73) Assignees: STMicroelectronics (Rousset) SAS, Rousset (FR); STMicroelectronics (Alps) SAS, Grenoble (FR); STMicroelectronics (Rousset) SAS, Le Mans (FR); STMicroelectronics (Grand Ouest) SAS, Rousset (FR)

( * ) Notice: Subject to any disclaimer, the term of this patent is extended or adjusted under 35 U.S.C. 154(b) by 42 days.

(21) Appl. No.: 17/100,505

(22) Filed: Nov. 20, 2020

(65) Prior Publication Data
US 2021/0160193 A1 May 27, 2021

(30) Foreign Application Priority Data
Nov. 22, 2019 (FR) ...................................... 1913126

(51) Int. Cl.
*H04L 41/0803* (2022.01)
*H04L 49/109* (2022.01)
*G06F 21/85* (2013.01)

(52) U.S. Cl.
CPC ............ *H04L 49/109* (2013.01); *G06F 21/85* (2013.01); *H04L 41/0803* (2013.01)

(58) Field of Classification Search
CPC ................. H04L 9/109; H04L 41/0803; H04L 29/08072; H04L 29/06; G06F 21/85
(Continued)

(56) References Cited

U.S. PATENT DOCUMENTS

| 5,919,255 A | 7/1999 | Seshan et al. |
| 6,145,041 A | 11/2000 | Chambers |

(Continued)

FOREIGN PATENT DOCUMENTS

| BR | 112013025855 A2 * | 12/2016 | ........... G06F 1/3284 |
| EP | 2521345 A2 | 11/2012 | |

(Continued)

OTHER PUBLICATIONS

Gerstlauer, A., "EE382V System-on-a-Chip (SoC) Design," Lecture 12—SoC Communication Architectures, University of Texas at Austin, © 2014 A. Gerstlauer, 43 pages.

(Continued)

*Primary Examiner* — Khanh Q Dinh
(74) *Attorney, Agent, or Firm* — Slater Matsil, LLP

(57) ABSTRACT

System on a chip, comprising several master pieces of equipment, several slave resources, an interconnection circuit coupled between the master pieces of equipment and the slave resources and capable of routing transactions between master pieces of equipment and slave resources. A first particular slave resource cooperates with an element of the system on a chip, for example a clock signal generator, and the element has the same access rights as those of the corresponding first particular slave resource.

20 Claims, 15 Drawing Sheets

(58) Field of Classification Search
USPC .................................. 709/206, 220, 224, 227
See application file for complete search history.

(56) References Cited

U.S. PATENT DOCUMENTS

| | | | |
|---|---|---|---|
| 7,023,979 B1* | 4/2006 | Wu ..................... | H04M 3/5233 |
| | | | 379/265.11 |
| 7,228,440 B1 | 6/2007 | Giles et al. | |
| 7,353,259 B1 | 4/2008 | Bakke et al. | |
| 7,870,455 B2 | 1/2011 | Mayer | |
| 9,091,727 B1* | 7/2015 | Lupu .............. | G01R 31/318519 |
| 9,143,392 B2 | 9/2015 | Duchesneau | |
| 9,703,944 B2 | 7/2017 | Hopkins et al. | |
| 9,946,674 B2 | 4/2018 | Mayer et al. | |
| 10,176,131 B1 | 1/2019 | Arbel | |
| 10,372,883 B2 | 8/2019 | Hurst et al. | |
| 11,308,573 B2* | 4/2022 | Nystad ................ | G06F 13/4068 |
| 2002/0083387 A1 | 6/2002 | Miner et al. | |
| 2003/0108030 A1 | 6/2003 | Gao | |
| 2004/0064757 A1 | 4/2004 | Jahnke | |
| 2004/0158784 A1 | 8/2004 | Abuhamdeh et al. | |
| 2004/0216080 A1 | 10/2004 | Roesner et al. | |
| 2005/0188248 A1 | 8/2005 | O'Brien et al. | |
| 2005/0235281 A1 | 10/2005 | Lefrancois | |
| 2006/0174163 A1 | 8/2006 | Gravoille et al. | |
| 2006/0193273 A1* | 8/2006 | Passier ............. | H04N 21/43637 |
| | | | 370/310 |
| 2006/0239692 A1 | 10/2006 | Lee et al. | |
| 2007/0116023 A1 | 5/2007 | Tatapudi et al. | |
| 2007/0182445 A1 | 8/2007 | Chen et al. | |
| 2008/0062891 A1* | 3/2008 | Van der Merwe ...... | H04L 45/04 |
| | | | 370/254 |
| 2008/0123423 A1* | 5/2008 | Kim ..................... | G11C 7/1048 |
| | | | 365/185.11 |
| 2008/0183305 A1 | 7/2008 | Foster et al. | |
| 2008/0204089 A1* | 8/2008 | Nakasha ................ | H03B 19/14 |
| | | | 327/118 |
| 2009/0324764 A1 | 12/2009 | Sekihara et al. | |
| 2010/0067507 A1* | 3/2010 | Park ..................... | H04W 56/00 |
| | | | 370/350 |
| 2011/0016310 A1 | 1/2011 | Yong | |
| 2011/0016338 A1 | 1/2011 | Williamson et al. | |
| 2012/0030730 A1 | 2/2012 | Smith et al. | |
| 2012/0079590 A1 | 3/2012 | Sastry et al. | |
| 2012/0239895 A1 | 9/2012 | Zbiciak et al. | |
| 2012/0266230 A1 | 10/2012 | Vanderpol et al. | |
| 2013/0059576 A1* | 3/2013 | Park ..................... | H04W 56/00 |
| | | | 455/422.1 |
| 2013/0151829 A1 | 6/2013 | Amann et al. | |
| 2014/0006644 A1 | 1/2014 | Pullagoundapatti et al. | |
| 2015/0113100 A1 | 4/2015 | Tweedale et al. | |
| 2015/0234734 A1 | 8/2015 | Agrawal | |
| 2016/0019180 A1 | 1/2016 | Liu et al. | |
| 2016/0179646 A1 | 6/2016 | Neve De Mevergnies et al. | |
| 2016/0179740 A1* | 6/2016 | Halleck ............... | G06F 13/4221 |
| | | | 710/106 |
| 2016/0350225 A1 | 12/2016 | Podaima et al. | |
| 2017/0147807 A1 | 5/2017 | Rooyakkers | |
| 2018/0013578 A1 | 1/2018 | Gozloo et al. | |
| 2019/0179645 A1* | 6/2019 | Prasad ................. | H04L 41/0843 |
| 2019/0294344 A1* | 9/2019 | Hahn .................... | G06F 3/0614 |
| 2019/0303328 A1 | 10/2019 | Balski et al. | |
| 2020/0065280 A1* | 2/2020 | Huang .................. | G06F 13/362 |
| 2020/0092449 A1* | 3/2020 | Chang .................... | G02B 7/021 |
| 2021/0157668 A1 | 5/2021 | Pallardy et al. | |
| 2021/0160134 A1 | 5/2021 | Anquet et al. | |
| 2021/0160193 A1 | 5/2021 | Olson et al. | |

FOREIGN PATENT DOCUMENTS

| | | | | |
|---|---|---|---|---|
| EP | 2621136 A2 * | 7/2013 | ......... | H04L 41/0654 |
| FR | 3003054 A1 | 9/2014 | | |
| WO | 2016099812 A1 | 6/2016 | | |

OTHER PUBLICATIONS

Venkateswara Rao, M., et al., "A Frame work on AMBA bus based Communication Architecture to improve the Real Time Computing Performance in MPSoC," International Journal of Computer Applications (0975-8887), Apr. 2014, 5 pages, vol. 91, No. 5.
"Octo-SPI Interface on STM32 Microcontrollers," AN5050, Revision 7, Application Note, STMicroelectronics, Sep. 2021, 74 pages.
"SPC58EHx/SPC58NHx N OctalSPI IO Manager," TN1365, Technical Note, STMicroelectronics, Jun. 2021, 8 pages.

* cited by examiner

METHOD FOR MANAGING THE CONFIGURATION OF ACCESS TO PERIPHERALS AND THEIR ASSOCIATED RESOURCES OF A SYSTEM ON CHIP, AND CORRESPONDING SYSTEM ON CHIP

CROSS-REFERENCE TO RELATED APPLICATIONS

This application claims the benefit of French Application No. 1913126, filed on Nov. 22, 2019, which application is hereby incorporated herein by reference.

TECHNICAL FIELD

Embodiments of the invention relate to integrated circuits, in particular systems on a chip (SoC), for example a (multi-core or single-core) microcontroller, or a microprocessor, in particular the management of the operation of such a system on a chip and more particularly the management of the configuration of access to peripherals of the system on a chip and their associated resources.

BACKGROUND

A resource associated with a peripheral is an element of the system on a chip, for example a clock signal generator, cooperating with the peripheral during the operation of the system on a chip.

In order to help ensure the reliability of a system on a chip, it may be necessary to restrict the access of one or more master pieces of equipment to particular slave resources. Such a feature is designated by the person skilled in the art under the term "isolation."

There is a need to make management of these access restrictions simple to carry out and to implement, particularly in the case where this management is dynamic, for example when it depends on the applications considered for the system on a chip, for example of the applications considered on the multiple cores of the chip.

There is also a need to provide a system on a chip, for example a microcontroller or a microprocessor, allowing all the cases of use emanating from the various users of the system on a chip as well as all the configurations in a flexible manner, and particularly including a low power mode.

There is in particular a need to provide management of the configuration of access to peripherals and their associated resources (or elements), for example but in a non-limiting manner to generators of clock signals, of reset signals of power signals, allowing simplification of programming, of debugging the system on a chip while ensuring consistency in the overall configuration of the system on a chip.

SUMMARY

According to one aspect, a system on a chip, for example a microcontroller, comprising several master pieces of equipment is proposed, for example, when the system particularly forms a microcontroller, at least one microprocessor and generally several microprocessors, a direct memory access controller (DMA: Direct Memory Access) without these examples being limiting.

The system on a chip moreover includes several slave resources.

By way of non-limiting example, a slave resource can belong to the group formed by at least one peripheral, for example a peripheral of the PC ("Inter Integrated Circuit") type, of the SPI ("Serial Peripheral Interface) type, of the UART ("Universal Asynchronous Receiver Transmitter) type, or else a Real Time Clock (RTC), a feature of a peripheral, for example an alarm line of the RTC peripheral, a memory means internal to the system on a chip, a memory interface internal to the system on a chip and intended to be coupled to a memory means external to the system on a chip, for example a DDR ("Double Data Rate") type memory.

Moreover, at least one master piece of equipment can be controllable by a microprocessor and includes an output port capable of emitting transactions as well as an input port capable of receiving transactions.

The input port is then considered as a slave resource and the output port as a master piece of equipment.

The slave resources include a first particular slave resource coupled to at least one element of the system on a chip intended to cooperate with the first particular slave resource during the operation of the system on a chip.

Of course, the system on a chip can generally include several first particular slave resources coupled to several elements of the system on a chip.

As a non-limiting example, a first particular slave resource belongs to the group formed by a peripheral, a feature of a peripheral, and an input port of a master piece of equipment controllable by a microprocessor.

As a non-limiting example, the at least one element belongs to the group formed by a generator of at least one clock signal, a generator of at least one reset signal, a power block and at least one configurable input/output pin of the system on a chip.

The system on a chip moreover includes an interconnection circuit (known by the person skilled in the art under the name "interconnect") coupled between the master pieces of equipment, the slave resources and the element(s) and capable of routing transactions (for example write or read transactions) between master pieces of equipment, slave resources and the element(s).

The system on a chip moreover includes processing means at least configured to allow a user of the system on a chip to implement within the system on a chip at least one configuration diagram of this system on a chip, this configuration diagram being defined by a set of configuration pieces of information assigned to the master pieces of equipment, to the slave resources as well as to the at least one element.

The set of configuration pieces of information is used to define an assignment of at least one master piece of equipment to at least some of the slave resources, or else an assignment of at least some of the slave resources to at least one master piece of equipment.

The configuration pieces of information assigned to the at least one element are identical to the configuration pieces of information assigned to the first particular slave resource.

Thus, all the resources or elements of the system on a chip, for example used by or associated with a peripheral, have the same access rights as the peripheral.

There is, in other words, an inheritance at each element of the configuration pieces of information assigned to the particular slave resource which is coupled thereto and with which it cooperates during the operation of the integrated circuit.

This unique configuration between a slave resource and the element(s) which are coupled thereto, thus simplifies the programming of the system on a chip, the debugging and ensures configuration consistency.

According to one embodiment, the system comprises,
- a set of configuration registers assigned to each slave resource and to each master piece of equipment, the set of configuration registers assigned to a slave resource being intended to store the various configuration pieces of information assigned to this slave resource, and
- a configuration controller configured to update the contents of the sets of configuration registers with the set of configuration pieces of information under the control of a first master piece of equipment called master manager piece of equipment.

According to one embodiment, at least one piece of configuration information is intended to be attached to each transaction, and the processing means include verification means configured to verify whether a transaction emanating from a master piece of equipment and intended for an element coupled to a first particular slave resource is authorized to access this element, using the at least one piece of configuration information attached to the transaction as well as the configuration pieces of information assigned to this first particular slave resource.

The verification means are advantageously configured to perform the verification downstream of the interconnection circuit.

Indeed, performing a verification downstream of the interconnection circuit and not upstream allows homogeneity of implementation and easily allows to add a slave resource in an easier manner or even to have a register or bit-exact granularity.

To complete this homogeneity of implementation and this ease of adding a slave resource if necessary, the verification means advantageously include, for each slave resource, an elementary verification module configured to access the set of configuration pieces of information assigned to this slave resource and for each element, an elementary verification module configured to access the configuration pieces of information assigned to the first corresponding particular slave resource.

There is therefore a decentralization of the verification means into localized modules.

Each elementary verification module assigned to a slave resource is connected by a dedicated link to the set of configuration registers assigned to this slave resource and each elementary verification module assigned to an element is connected by a dedicated link to the set of configuration registers assigned to the first corresponding particular slave resource.

These specific links, for example metal tracks, allow avoiding the use of buses of the system on a chip.

The set of configuration pieces of information comprises for example at least one identification piece of information assigned to each master piece of equipment.

It is quite possible, in a very simple case, that the set of configuration pieces of information includes only the identification pieces of information assigned to the master pieces of equipment. And these identification pieces of information alone allow easily managing and defining the system on a chip isolation architecture.

However, the set of configuration pieces of information can generally include other configuration pieces of information than the identification piece of information, which will allow refining the isolation architecture, with greater flexibility.

Thus, the set of configuration pieces of information of the configuration diagram may further comprise for at least one slave resource, an inaccessibility piece of information intended to indicate that this slave resource is inaccessible by any master piece of equipment.

According to one embodiment, the set of configuration pieces of information defining the configuration diagram further comprises for each non-inaccessible slave resource, a filtering piece of information intended to indicate whether this slave resource can be accessed by any master piece of equipment or by only one or more master pieces of equipment.

According to one embodiment, the set of configuration pieces of information defining the configuration diagram further comprises, for each non-inaccessible slave resource,
- a first access piece of information intended to indicate, in the case where the filtering piece of information indicates that the slave resource can be accessed by only one or more master pieces of equipment, that this slave resource can be accessed by one or more master pieces of equipment having the same identification piece of information, and
- the corresponding identification piece of information.

According to one embodiment, the set of configuration pieces of information defining the configuration diagram further comprises for each non-inaccessible slave resource,
- a second access piece of information intended to indicate, in the case where the filtering piece of information indicates that the slave resource can be accessed by only one or more master pieces of equipment, that this slave resource can be accessed by master pieces of equipment having different identification pieces of information, and
- the list of identification pieces of information of the corresponding master pieces of equipment.

According to one embodiment, the set of configuration pieces of information defining the configuration diagram further comprises for at least one of the slave resources that can be accessed by the master pieces of equipment of the list,
- a third piece of information intended to indicate that the at least one of the slave resources can only be accessed by one master piece of equipment at a time,
- the master piece of equipment wishing to access this slave resource being configured to use a semaphore.

According to one embodiment, the set of configuration pieces of information defining the configuration diagram further comprises for each non-inaccessible slave resource, a security piece of information intended to indicate whether this slave resource is accessible by a master piece of equipment in secure mode or not.

According to one embodiment, the set of configuration pieces of information defining the configuration diagram further comprises, for each non-inaccessible slave resource, a privileged piece of information intended to indicate whether this slave resource is accessible by a master piece of equipment in privileged mode or not.

The concept of secure mode or privileged mode is well known to the person skilled in the art In the above, one or more elements cooperate for example with a single slave resource.

However, the system on a chip may include other slave resources, here called second particular slave resources, for example channels of a DMA controller, capable of being accessed by several master pieces of equipment, but sharing at least a same element.

For example, a single clock signal generator and a single reset signal generator can be assigned to the DMA controller and therefore shared by all DMA channels.

And particularly for security reasons, it is highly preferable to select the one of the master pieces of equipment which will be able to have access to these generators, so as for example to prohibit master pieces of equipment having a lower degree of security, from controlling these clock and reset signal generators.

Thus, according to one embodiment, the slave resources include several second particular slave resources coupled at least to the same element of the system on a chip, and capable of being accessed by several master pieces of equipment, and the processing means including selection means configured to select the master piece of equipment authorized to access the at least one same element.

The selection means may include at least one selection register configured to store the identification piece of information of the master piece of equipment authorized to access the at least one same element.

The configuration controller is advantageously also configured to update the content of the selection register(s).

The verification means are advantageously also configured to verify whether a transaction emanating from a master piece of equipment and intended for the at least one same element is authorized to access this same element, using the at least one piece of configuration information attached to the transaction as well as the content of the selection register(s).

According to one embodiment the verification means include for each same element an elementary verification module configured to access the content of the selection register(s).

And the elementary verification module is advantageously connected to the selection register(s) by a specific link.

According to another aspect a method for managing the operation of a system on a chip is proposed, the system on a chip comprising several master pieces of equipment, several slave resources including a first particular slave resource coupled to at least one element of the system on a chip cooperating with the first particular slave resource during the operation of the system on a chip, an interconnection circuit coupled between the master pieces of equipment and the slave resources and the element(s) and capable of routing transactions between master pieces of equipment, slave resources and the element(s), the method comprising
  a configuration phase including
    defining at least one configuration diagram by a set of configuration pieces of information assigned to the master pieces of equipment, to the slave resources as well as to the at least one element, this set of configuration pieces of information allowing to define an assignment of at least one master piece of equipment to at least some of the slave resources, the configuration pieces of information assigned to the at least one element being identical to the configuration pieces of information assigned to the first particular slave resource, and
    implementing within the system on a chip the at least one configuration diagram, and
  an operating phase including addressing the slave resources without using the set of these configuration pieces of information.

According to one embodiment, the method comprises coupling several first particular slave resources to several elements of the system on a chip.

According to one embodiment,
  a slave resource belongs to the group formed at least of a peripheral, a feature of a peripheral, a memory means internal to the system on a chip, a memory interface internal to the system on a chip and intended to be coupled to a memory means external to the system on a chip,
  at least one master piece of equipment is controllable by a microprocessor and includes an output port capable of emitting transactions as well as an input port capable of receiving transactions, the input port being considered as a slave resource and the output port as master piece of equipment,
  a first particular slave resource belongs to the group formed by a peripheral, a feature of a peripheral, and an input port of a master piece of equipment controllable by a microprocessor, and
  the at least one element belongs to the group formed by a generator of at least one clock signal, a generator of at least one reset signal, a power block and at least one configurable input/output pin of the system on a chip.

According to one embodiment, the method comprises updating the configuration pieces of information assigned to each slave resource and to each master piece of equipment, under the control of a first master piece of equipment called master manager piece of equipment.

According to an implementation mode at least one piece of configuration information is attached to each transaction, and the operating phase comprises verifying whether a transaction emanating from a master piece of equipment and intended for an element coupled to a first particular slave resource is authorized to access this element, the verification including the use of the at least one piece of configuration information attached to the transaction as well as the configuration pieces of information assigned to this first particular slave resource.

According to one embodiment, the verification is performed downstream of the interconnection circuit.

According to one embodiment the verification comprises local verifications performed at the slave resources from the configuration pieces of information respectively assigned to these slave resources, and at each element from the configuration pieces of information assigned to the first corresponding particular slave resource.

According to one embodiment, the set of configuration pieces of information comprises at least one identification piece of information assigned to each master piece of equipment.

According to one embodiment the set of configuration pieces of information of the configuration diagram further comprises, for at least one slave resource, an inaccessibility piece of information indicating whether this slave resource is inaccessible by any master piece of equipment or not.

According to one embodiment the set of configuration pieces of information defining the configuration diagram further comprises, for each non-inaccessible slave resource, a filtering piece of information indicating whether this slave resource can be accessed by any master piece of equipment or by only one or more master pieces of equipment.

According to one embodiment the set of configuration pieces of information defining the configuration diagram further comprises for each non-inaccessible slave resource,
  a first access piece of information indicating, in the case where the filtering piece of information indicates that the slave resource can be accessed by only one or more master pieces of equipment, that this slave resource can be accessed by one or more master pieces of equipment having the same identification piece of information, and
  the corresponding identification piece of information.

According to one embodiment the set of configuration pieces of information defining the configuration diagram further comprises for each non-inaccessible slave resource,
a second access piece of information indicating, in the case where the filtering piece of information indicates that the slave resource can be accessed by only one or more master pieces of equipment, that this slave resource can be accessed by master pieces of equipment having different identification pieces of information, and
the list of identification pieces of information of the corresponding master pieces of equipment.

According to one embodiment, the set of configuration pieces of information defining the configuration diagram further comprises for at least one of the slave resources that can be accessed by the master pieces of equipment of the list,
a third piece of information indicating that the at least one of the slave resources can only be accessed by one master piece of equipment at a time,
the master piece of equipment wishing to access this slave resource during the operating phase using a semaphore.

According to one embodiment the set of configuration pieces of information defining the configuration diagram further comprises for each non-inaccessible slave resource, a security piece of information indicating whether this slave resource is accessible by a master piece of equipment in secure mode or not.

According to one embodiment the set of configuration pieces of information defining the configuration diagram further comprises for each non-inaccessible slave resource, a privileged piece of information indicating whether this slave resource is accessible by a master piece of equipment in privileged mode or not.

According to one embodiment the slave resources include several second particular slave resources coupled at least to the same element of the system on a chip, and capable of being accessed by several master pieces of equipment, and the configuration phase includes a selection of the master piece of equipment authorized to access the at least one same element.

According to one embodiment, the method comprises storing the identification piece of information of the master piece of equipment authorized to access the at least one same element.

According to one embodiment the verification also comprises additionally verifying that a transaction emanating from a master piece of equipment and intended for the at least one same element, is authorized to access this same element, using the at least one piece of configuration information attached to the transaction as well as the identification piece of information of the master piece of equipment authorized to access the at least one element.

According to one embodiment the additional verification is performed locally at each same element.

According to one embodiment, the system on a chip forms a microcontroller or a microprocessor.

BRIEF DESCRIPTION OF THE DRAWINGS

Other advantages and features of the description will appear upon examining the detailed description of non-limiting embodiments and appended drawings.

DETAILED DESCRIPTION OF ILLUSTRATIVE EMBODIMENTS

Figure 1:
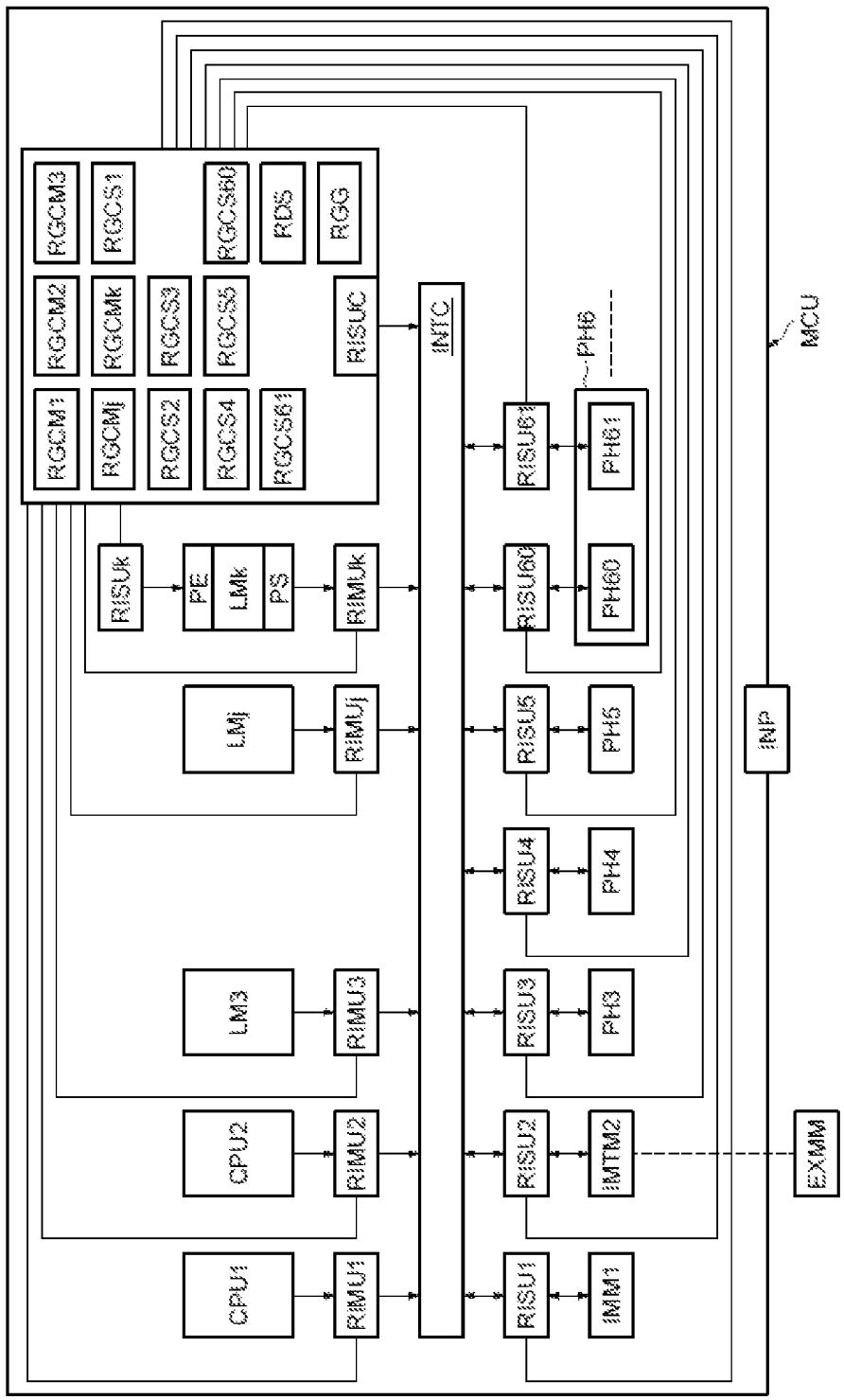
FIG. 1 illustrates a system on a chip.

In FIG. 1, the reference MCU designates a system on a chip here forming a microcontroller, although this example is not limiting.

The system on a chip MCU here comprises several master pieces of equipment CPU1, CPU2, LM3 . . . LMj . . . LMk.

In this example, the master pieces of equipment CPU1 and CPU2 are microprocessors and the other master pieces of equipment can be for example master pieces of equipment of Direct Memory Access type (DMA) or else for example USB controllers or even PCI express type master piece of equipment, without this list of examples being exhaustive.

The system on a chip MCU also includes several slave resources IMM1, IMTM2, PH3, PH4, PH5, PH60 and PH61.

Generally, a slave resource belongs to the group formed at least by a peripheral, a feature of a peripheral, a memory means internal to the system on a chip MCU, a memory interface internal to the system on a chip and intended to be coupled to a memory means external to the system on a chip.

Thus, in the example illustrated, the slave resource IMM1 is a memory means for the system on a chip.

The term "memory means" is understood here in a general manner and incorporates for example a complete memory or then one or more memory areas for example.

The slave resource IMTM2 is here an internal memory interface intended to be coupled to an external memory means EXMM, for example a DRAM memory.

The slave resources PH3, PH4 and PH5 are peripherals, for example a UART type peripheral, an PC controller, or an SPI controller.

The reference PH6 here designates a Real Time Clock (RTC) device including for example the module PH60 intended to provide the clock signal and the module PH61 intended for example to provide an alarm.

In this case, the modules PH60 and PH61 which are features of the real time clock device PH6 are considered as slave resources.

The structure of the master pieces of equipment and of the slave resources is conventional and known per se.

The system on a chip MCU moreover includes an interconnection circuit INTC capable of routing transactions between master pieces of equipment and slave resources.

The structure of such an interconnection circuit, which is generally a multilayer interconnection circuit, as well as the protocol allowing the exchange and the routing of the transactions inside the interconnection circuit are well known to the person skilled in the art.

This can for example refer in particular:
- to the article by Venkateswara Rao and others entitled "A Frame work on AMBA bus based Communication Architecture to improve the Real Time Computing Performance in MPSoC," International Journal of Computer Applications (0975-8887), Volume 91—No 5, April 2014, or
- a general presentation of these interconnection circuits made in 2015 by A. Gerstlauer and available at the internet address http://users.ece.utexas.edu/~gerstl/ee382v_f14/lectures/lecture_12.pdf.

Moreover, in an indicative but non-limiting manner, for example the interconnection circuit marketed by the company ARM under the reference NIC-400 (version Rop3) can be used.

The system on a chip also includes, associated with each master piece of equipment and with each slave resource, a set of configuration registers including several configuration registers intended for storing configuration pieces of information respectively, the meaning of which will be explained in more detail below.

The reference RGCM1 designates the set of configuration registers associated with the master piece of equipment CPU1.

The reference RGCM2 designates the set of configuration registers associated with the master piece of equipment CPU2.

The reference RGCM3 designates the set of configuration registers assigned to the master piece of equipment LM3.

The reference RGCMj designates the set of configuration registers assigned to the master piece of equipment LMj.

Moreover, the system on a chip here includes the master piece of equipment LMk, for example a USB controller controllable by a microprocessor, for example the microprocessor CPU1, and this master piece of equipment LMk includes an output port PS capable of emitting transactions as well as an input port PE capable of receiving transactions.

The input port PE is then considered as a slave resource and the output port PS is then considered as a master piece of equipment.

Therefore, the reference RGCMk designates the set of configuration registers assigned to the master piece of equipment PS.

The reference RGCS1 designates the set of configuration registers assigned to the slave resource IMM1.

The reference RGCS2 designates the set of configuration registers associated with the slave resource IMTM2.

The reference RGSC3 designates the set of configuration registers associated with the peripheral PH3.

The reference RGCS4 designates the set of configuration registers assigned to the peripheral PH4.

The reference RGCS5 designates the set of configuration registers assigned to the peripheral PH5.

The reference RGCS60 designates the set of configuration registers assigned to the feature PH60.

And, the reference RGCS61 designates the set of configuration registers assigned to the feature PH61.

Moreover, in this example, a register RDS, called designation register, is provided, the feature of which will be discussed in more detail but, which, can already be indicated that it is used to designate a master piece of equipment having the quality of a master manager piece of equipment.

Moreover, the register RGG, called master manager piece of equipment register, the feature of which will also be discussed below in more detail, is used to designate the current master manager piece of equipment, which, as will be seen in more detail below, may possibly be modified during the operation of the system on a chip MCU, that is to say here during the execution of a user program.

The various sets of configuration registers are shown here within a controller RIFC.

However, they could be located outside the controller.

The system on a chip MCU also includes an elementary management unit RIMU1, RIMU2, RIMU3, RIMUj, RIMUk associated with each master piece of equipment.

The structure and feature of these elementary management units can be discussed in more detail, but it can be said that they are part of addition means intended to add to any transaction emitted by a master piece of equipment, an identification piece of information CID and optionally a security piece of information and/or a privileged piece of information.

The system on a chip also includes, associated with each slave resource, an elementary verification module RISU1, RISU2, RISU3, RISU4, RISU5, RISU60 and RISU61 the structure and feature of which will also be discussed in more detail below.

It can already be said that these elementary verification modules are part of the verification means intended to verify whether a transaction intended for a slave resource is authorized to access this slave resource.

The various elementary management units RIMU and the various elementary verification modules RISU are respectively connected to the sets of corresponding configuration registers by specific links, for example metal tracks.

While the elementary verification modules RISUi have been shown in FIG. 1 outside the corresponding peripherals, it is quite possible to provide one or more peripherals having their corresponding elementary verification module, integrated into the peripheral itself.

In addition to what has just been described, among the slave resources, the peripheral PH4 is in this example, coupled to an element EL4 intended to cooperate with the peripheral PH4 during the operation of the system on a chip.

Such a slave resource is designated below by the expression "first particular slave resource."

Of course, while for reasons of simplification of the figure, only one first particular slave resource PH4 has been shown, some of them or all the slave resources can be considered as first particular slave resources.

The element EL4 is for example a clock signal generator or a reset signal generator without these two examples being limiting and exhaustive.

The particularity of such a coupling between an element and a particular first slave resource can be discussed later in more detail, but it already can be said that configuration pieces of information are assigned to such an element and are identical to those assigned to the first particular slave resource cooperating with this element.

In this regard, the system on a chip also includes, associated with this element EL4, an elementary verification module RISUL4 the structure and feature of which will also be discussed in more detail below.

It can already be said that here again this elementary verification module is part of the verification means intended to verify whether a transaction intended for this element is authorized to access this element.

In this regard, this elementary verification module RISUL4 is connected to the set of configuration registers RGCS4 assigned to the peripheral PH4 by a specific link, for example metal tracks.

Figure 2:
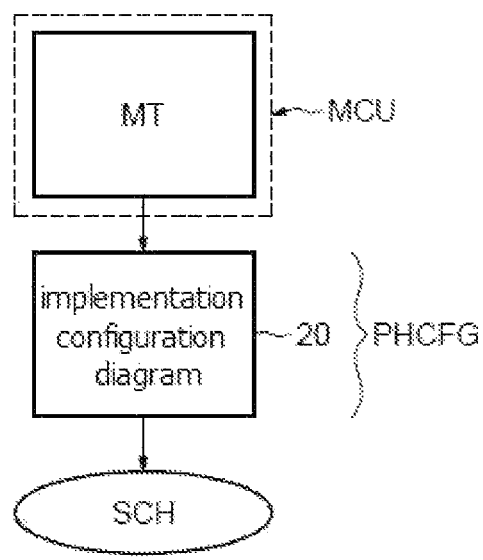
FIG. 2 illustrates a processing means of the system on a chip.

Now, if reference is made more particularly to FIG. 2, the system on a chip MCU includes processing means MT, distributed in particular within the various elements which have been described with reference to FIG. 1, and configured to allow a user of the system on a chip to implement within the system on a chip, during a configuration phase PHCFG (step 20), a configuration diagram SCH which is defined by the set of configuration pieces of information which will be stored in the various sets of configuration registers.

Before discussing in more detail the constitution of these configuration pieces of information, it can already be noted that the user has the possibility of implementing a static or dynamic configuration.

Figure 3:
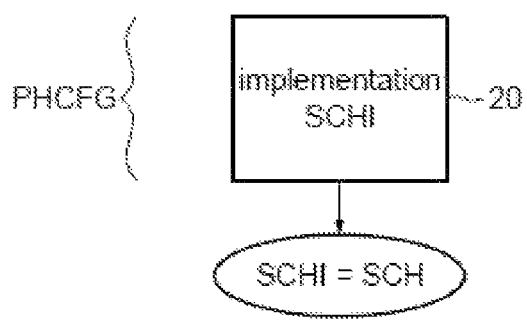
FIG. 3 illustrates static implementation of a configuration diagram.

More specifically, as illustrated in FIG. 3, the processing means are configured to allow a user of the system on a chip to implement (step 20) an initial configuration diagram SCHI which will form the configuration diagram SCH.

In other words, according to this variant, once the initial configuration diagram has been implemented, it remains valid during the use or operating phase of the system on a chip.

Figure 4:
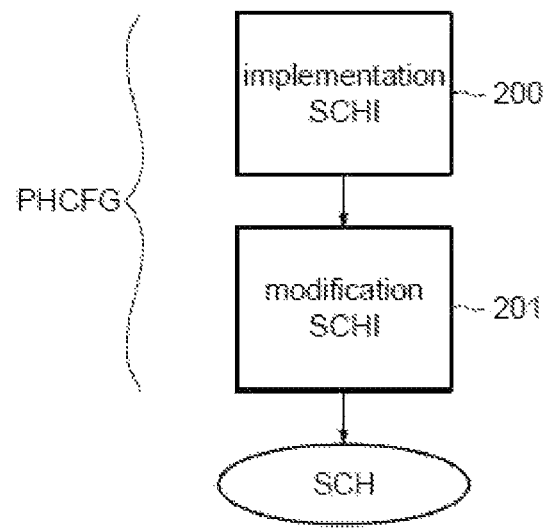
FIG. 4 illustrates dynamic implementation of a configuration diagram.

Alternatively, as illustrated in FIG. 4, it is possible for a user, during the configuration phase PHCFG, to have implemented by the processing means MT (step 200) an initial configuration diagram having an initial set of configuration pieces of information then having the initial configuration diagram modified (step 201) by the processing means by modifying the value of at least one piece of configuration information, for example, of this initial set so as to obtain the set of configuration pieces of information defining a new configuration diagram SCH.

The processing means comprise installation means which include, from the master pieces of equipment, a first master piece of equipment called first master manager piece of equipment.

Figure 5:
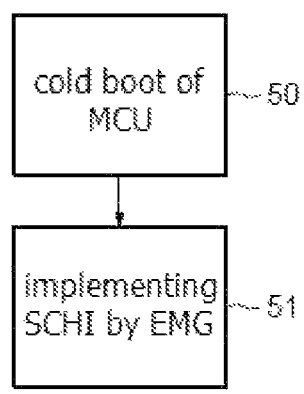
FIG. 5 illustrates a master manager piece of equipment implementing an initial configuration diagram.

As illustrated in FIG. 5, this first master manager piece of equipment EMG is configured, in response to a first boot 50, or cold boot of the system on a chip, to perform a boot phase at the end of which this first master manager piece of equipment EMG is configured to at least allow the implementation 51 of the initial configuration diagram SCHI.

Figure 6:
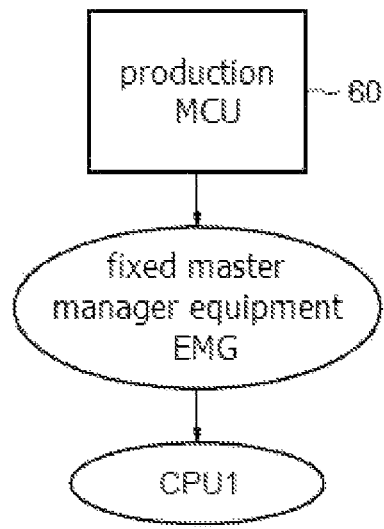
FIG. 6 illustrates a fixed designation of a master manager piece of equipment can be during production of the system on a chip.

As schematically illustrated in FIG. 6, the designation of the first master manager piece of equipment EMG can be fixed during the production 60 of the system on a chip MCU, for example by hard-coding.

Alternatively, it is possible for the user to use the programmable designation register RDS allowing designating the first master manager piece of equipment EMG.

Figure 7:
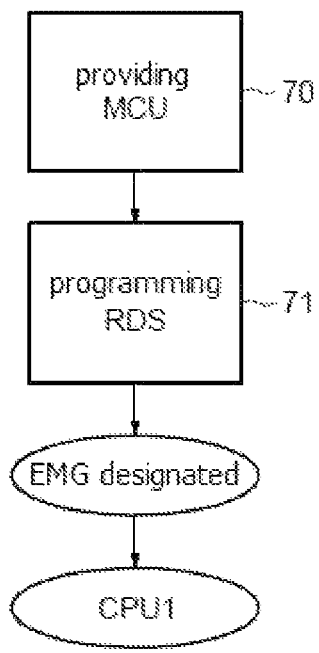
FIG. 7 illustrates user programming of a designation register to designate the master manager piece of equipment.

More specifically, as illustrated in FIG. 7, during the provision 70 of the system on a chip MCU, the user can proceed with a programming 71 of the designation register RDS, for example by programming or not series of memories of the OTP type forming the designation register RDS so as to designate the master manager piece of equipment EMG, which is for example in this example the microprocessor CPU1.

Figure 8:
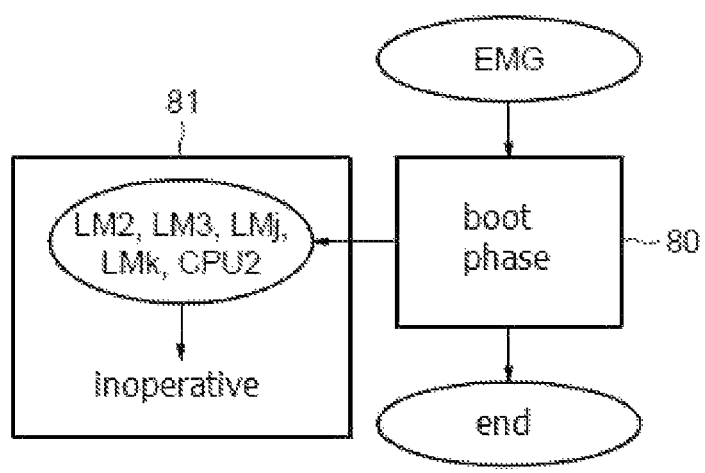
FIG. 8 illustrates all the other master pieces of equipment being rendered inoperative while a first master manager piece of equipment is in its boot phase.

In particular, in order to avoid conflicts, the installation means are further configured, as illustrated in FIG. 8, to temporarily make inoperative (step 81) all the other master pieces of equipment LM2, LM3, LMj, LMk, CPU2 as long as the first master manager piece of equipment EMG, here the microprocessor CPU1, has not completed its boot phase 80.

When a master piece of equipment is a microprocessor, it can be made inoperative by for example forcing the reset signal to 0 which keeps it in standby state.

When the other master pieces of equipment are pieces of equipment controlled by a microprocessor, they are of course inoperative as long as the processor itself is inoperative.

Figure 9:
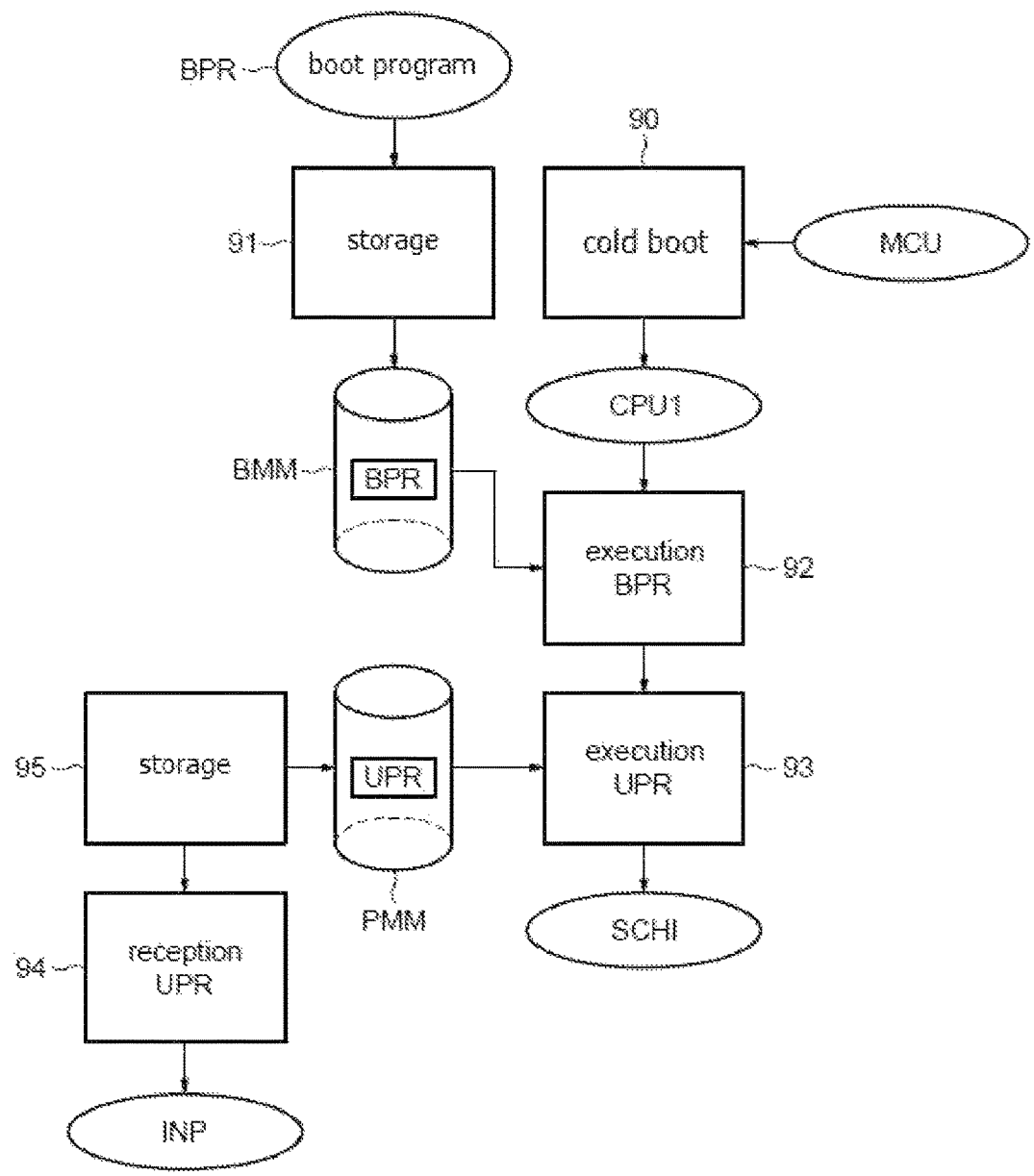
FIG. 9 illustrates installation means for implementing an initial configuration diagram.

By way of example, as illustrated in FIG. 9, the installation means include, in addition to the master manager piece of equipment EMG, a boot memory (boot ROM) BMM configured to store, in a storage step 91, a boot program BPR executable only by the first master manager piece of equipment CPU1 during the first boot or cold boot of the system on a chip (steps 90 and 92).

The installation means moreover include an input INP (FIG. 1) configured to receive a user program. This user program can for example be stored on an SD card cooperating with the input INP.

This user program UPR (FIG. 9) is received from the input INP in step 94 and stored (step 95) in a program memory PMM.

This user program UPR contains at least instructions representative of the initial configuration diagram SCHI.

The processing means then include allocation means allowing implementing the initial configuration diagram.

In this example, the allocation means include the first master manager piece of equipment (for example the microprocessor CPU1) configured, at the end of its boot phase, to execute (step 93) the user program UPR in order to implement the initial configuration diagram.

While a microprocessor, for example the microprocessor CPU1, has been described here as the first master manager piece of equipment EMG, it is quite possible, alternatively, that the first master manager piece of equipment comprises a hardware logic circuit.

Figure 10:
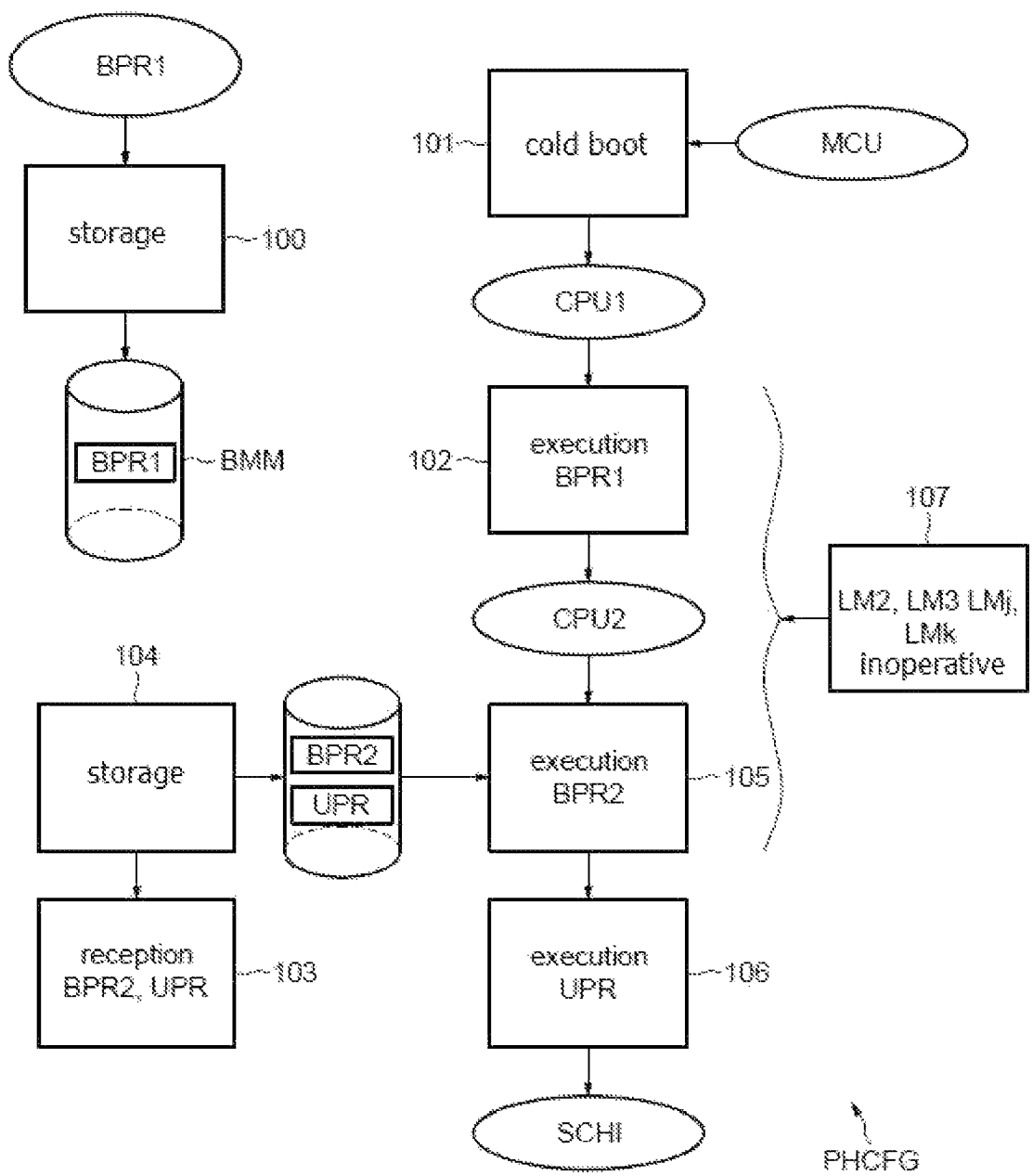
FIG. 10 illustrates installation means configured to make all the other master pieces of equipment inoperative during the boot phases of the initial and new master manager pieces of equipment.

While a single master manager piece of equipment has just been described during the configuration phase PHCFG, it is possible, as schematically illustrated in FIG. 10, to modify the master manager piece of equipment during this configuration phase.

More specifically, the installation means then include, from the master pieces of equipment, a master piece of equipment called the initial master manager piece of equipment, for example the microprocessor CPU1, configured, during the first boot of the system on a chip, to perform a boot phase at the end of which it is configured to authorise a boot of another master piece of equipment designated as a new master manager piece of equipment, for example the microprocessor CPU2.

This new master manager piece of equipment then forms the first master manager piece of equipment which is configured, at the end of its boot phase, to at least allow the implementation of the initial configuration diagram.

The initial master manager piece of equipment may comprise a microprocessor and the new master manager piece of equipment may comprise another microprocessor.

Alternatively, the initial master manager piece of equipment may comprise a hardware logic circuit and the new master manager piece of equipment may comprise a microprocessor.

And, here again, the installation means are configured to temporarily make all the other master pieces of equipment inoperative as long as the boot phase of the initial master manager piece of equipment and that of the new master manager piece of equipment are not completed.

As an example illustrated in FIG. 10, the installation means include in this regard a boot memory BMM configured to store (step 100) a boot program BPR1 executable only by the initial master manager piece of equipment CPU1 during the first boot or cold boot 101 of the system on a chip MCU.

The installation means also include a program memory PMM configured to store the boot program BPR2 of the new master manager piece of equipment CPU2.

A reception is then provided, for example via the input INP, of the boot program BPR2 and the user program UPR, these two programs being stored (step 104) in the program memory PMM.

During the cold boot 101, the initial master manager piece of equipment CPU1 executes its boot program BPR1 (step 102) and then authorises the boot of the microprocessor CPU2 which is the new master manager piece of equipment.

The latter executes in step 105 its boot program PBR2 then the user program UPR (step 106) in order to implement the initial configuration diagram SCHI.

Of course, as indicated above, in step 107, the other master pieces of equipment LM2, LM3, LMj and LMk are inoperative.

Figure 11:
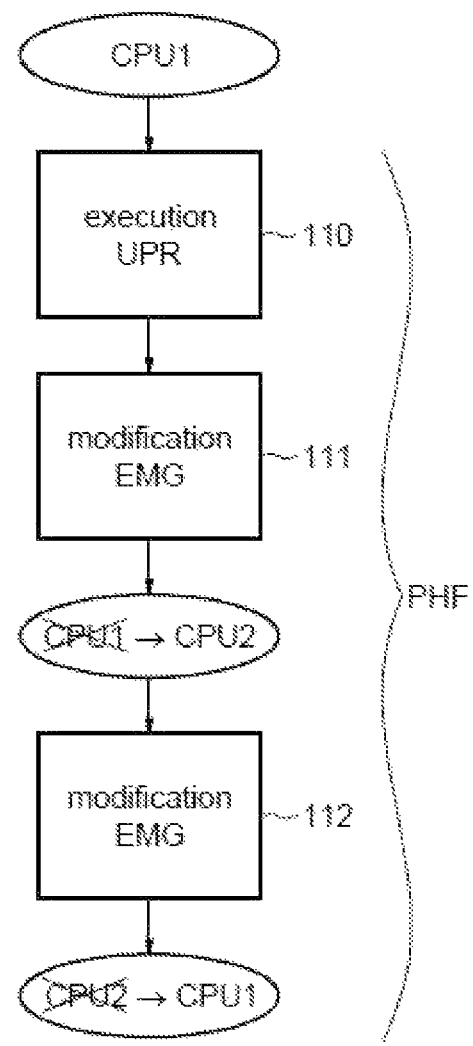
FIG. 11 illustrates changing the master manager piece of equipment during the execution of the user program after implementing the configuration diagram.

While it has been seen previously that it was possible to change master manager piece of equipment during the configuration phase, it is also possible, as illustrated in FIG. 11, to change master manager piece of equipment during the operating phase PHF of the system on a chip, that is to say during the execution of the user program after implementing the configuration diagram.

More specifically, in FIG. 11, the microprocessor CPU1 is a first master manager piece of equipment. And, during the execution 110 of the user program UPR, the processing means MT modify (step 111) the master manager piece of equipment EMG which, in this case, becomes a new master manager piece of equipment CPU2.

It is of course possible that this new master manager piece of equipment CPU2 can in turn designate (step 112) a new master manager piece of equipment and then lose its quality as master manager piece of equipment. As an example, this new master manager piece of equipment may again be the microprocessor CPU1.

In this regard, only the master manager piece of equipment can designate a new master manager piece of equipment. And for example this is done by writing in the manager register RGG by the current master manager piece of equipment, the identification piece of information of the new master manager piece of equipment.

From that moment, the old master manager piece of equipment then has lost its quality as master manager piece of equipment.

Figure 12:
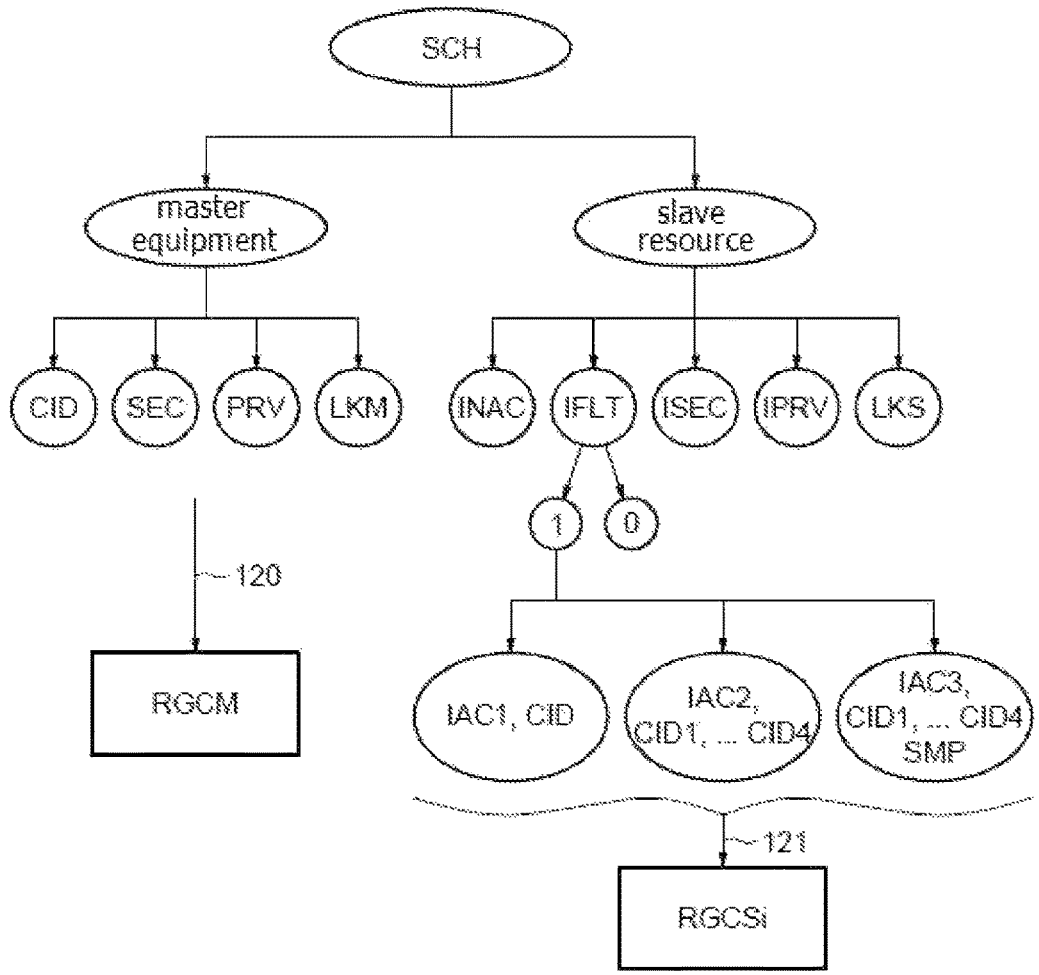
FIG. 12 illustrates an example of a set of configuration pieces of information defining a configuration diagram.

Reference is now made more particularly to FIG. 12 to illustrate an example of a set of configuration pieces of information defining a configuration diagram SCH.

The set of configuration pieces of information includes, for each equipment, an identification piece of information CID. This identification piece of information allows identifying the master piece of equipment from the list of master pieces of equipment.

This identification piece of information CID can for example be a digital word.

The set of configuration pieces of information of a master piece of equipment can also include a security piece of information SEC, for example a bit, indicating, depending on the logical value of the bit, whether this master piece of equipment is configured in secure mode or not.

The set of configuration pieces of information for a master piece of equipment may also include a privileged piece of information PRV, for example a bit, indicating according to the logical value of the bit whether this master piece of equipment is configured in privileged mode or not.

This privileged piece of information may include several bits if several levels of privileged modes are provided.

Finally, provision can be made for a locking piece of information LKM, for example one or more bits, which, depending on the logical value of the bit(s), indicate whether at least one of the configuration pieces of information, for example the configuration pieces of information SEC and PRV, or else the identification piece of information CID, can be modified or not.

It is also possible to provide one or more locking bits allowing locking the content of the manager register RGG designating the identification piece of information of the master manager piece of equipment.

These configuration pieces of information associated with the master pieces of equipment are stored (step 120) in the corresponding set of configuration register RGCMi.

As regards to a slave resource, the set of configuration pieces of information associated therewith can comprise, for example, an inaccessibility piece of information INAC, for example a bit, intended to indicate, according to the logical value of the bit, that this slave resource is inaccessible by any master piece of equipment.

The configuration diagram SCH further comprises, for a non-inaccessible slave resource, a filtering piece of information IFLT, for example a bit, intended to indicate, based only on the identification pieces of information CID of the master pieces of equipment, whether this slave resource can be accessed by any master piece of equipment or by only one or more master pieces of equipment.

Thus, for example, if the filtering piece of information has the logical value "o", this means that there is no filtering applied to the identification pieces of information and that consequently, a slave resource can be accessed by any master piece of equipment, subject to any other access restrictions that will be seen in more detail below.

In fact, these sets of configuration pieces of information allow assigning at least one master piece of equipment to a slave resource.

It should be noted that several master pieces of equipment can have the same identification piece of information CID.

This is the case, for example, when these master pieces of equipment include a microprocessor and one or more master pieces of equipment controllable by this microprocessor. In this case, a compartment designated by the identification piece of information CID is formed.

All the master pieces of equipment of this compartment can then have for example access to the same memory resources.

It is also possible that a master piece of equipment controlled by a microprocessor, for security reasons, does not have the same identification piece of information as the microprocessor. This is for example the case for an equipment of the PCI-E type. In this case, this allows limiting access to some memory resources of this PCI-E type master piece of equipment.

The set of configuration pieces of information defining the configuration diagram may further comprise, for the non-accessible slave resource, a first access piece of information IAC1 intended to indicate, in the case where the filtering piece of information IFLT (IFLT=1 for example) indicates that the considered slave resource can be accessed by only one or more master pieces of equipment, that this slave resource can be accessed by one or more master pieces of equipment having the same identification piece of information CID.

In this case, of course, the set of configuration pieces of information includes this corresponding identification piece of information CID.

As indicated above, this identification piece of information CID can relate to a single master piece of equipment or to several master pieces of equipment in the same compartment.

The set of configuration pieces of information defining the configuration diagram SHC can further comprise for this non-accessible slave resource, a second access piece of information IAC2 intended to indicate, in the case where the filtering piece of information IFLT (IFLT=1) indicates that the slave resource can be accessed by only one or more master pieces of equipment, that this slave resource can be accessed by master pieces of equipment having different identification pieces of information CID. And, in this case, the set of configuration pieces of information of this slave resource includes the list CID1 . . . CID4, for example, of identification pieces of information of the corresponding master pieces of equipment.

Such a slave resource which can be accessed by several master pieces of equipment sequentially or simultaneously, can for example be a memory means.

On the other hand, it is possible for this slave resource which can be accessed by the master pieces of equipment of the list, that the set of configuration pieces of information comprises a third piece of information IAC3 intended to indicate that this slave resource can only be accessed by one master piece of equipment at a time, the master piece of equipment wishing to access this slave resource being configured to use a semaphore SMP.

This is the case, for example, when a slave resource can be accessed by two microprocessors. Only the microprocessor that takes the semaphore can access this slave resource and until the microprocessor has released the semaphore, the other microprocessor cannot access it. It will only be able to access it when it has taken in turn the semaphore SMP.

The set of configuration pieces of information defining the configuration diagram SCH for this slave resource can also comprise a security piece of information ISEC, for example a bit, intended to indicate whether this slave resource is accessible by a secure master piece of equipment or not.

Likewise, the set of configuration pieces of information may include a privileged piece of information for this slave resource, for example a bit, IPRV, intended to indicate whether this slave resource is accessible by a master piece of equipment in privileged mode or not.

And, here again, it is also possible to use a locking piece of information LKS intended to indicate whether the configuration pieces of information of this slave resource can be modified or not.

All these configuration pieces of information assigned to a slave resource are stored (step 121) in the set of corresponding configuration registers RGCSi.

It should be noted here that the first master manager piece of equipment, for example the microprocessor CPU1, is configured to be in secure mode and in privileged mode at the end of its boot phase.

As indicated above, the allocation means allowing implementing the configuration diagram, particularly the initial configuration diagram, include the sets of configuration registers assigned to each slave resource and to each master piece of equipment as well as the configuration controller RIFC configured to update the contents of the sets of configuration registers with the set of configuration pieces of information under the control of the first master manager piece of equipment.

Figure 13:
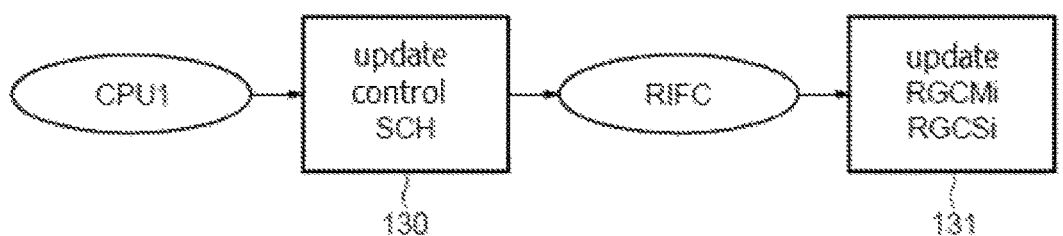
FIG. 13 illustrates a master manager piece of equipment controlling an update of the configuration diagram by the configuration controller which in turn updates the contents of the sets of registers.

This is schematically illustrated in FIG. 13.

More specifically, the master manager piece of equipment CPU1 controls (step 130) an update of the configuration diagram SCH which is performed by the configuration controller RIFC which updates the contents of the sets of registers RGCMi and RGCSi (step 131).

And, only the master piece of equipment which has the quality of master manager piece of equipment is configured to modify a configuration diagram.

Figure 14:
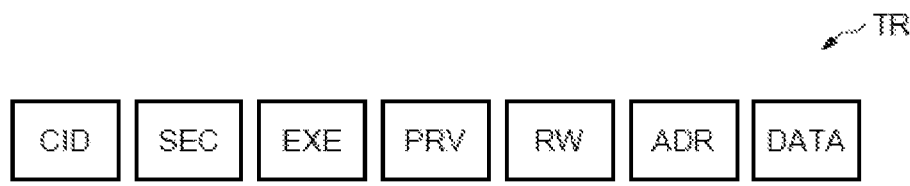
FIG. 14 illustrates an example of the content of a transaction.

Reference is now made more particularly to FIG. 14 to describe an example of the content of a transaction TR.

Generally, here, each transaction TR emitted by a master piece of equipment comprises an addressing field ADR whose content is intended to address the slave resource receiving this transaction.

But the content of the addressing field ADR does not belong to the set of configuration pieces of information.

In other words, the content of the addressing field is not used alone or in combination, to define the assignments of the master pieces of equipment to the slave resources.

More specifically, as illustrated in FIG. 14, each transaction TR includes the identification piece of information CID of the master piece of equipment emitting this transaction, the security piece of information SEC, an indication EXE intended to indicate whether or not this transaction contains an execution instruction, the privileged piece of information PRV, an information RW indicating whether it is a read or write transaction, the addressing field ADR and a data field DATA.

The processing means of the system on a chip include addition means configured to add to each transaction emitted by a master piece of equipment at least the identification piece of information of this master piece of equipment CID, this identification piece of information not belonging to the addressing field ADR of the transaction.

The addition means are further configured to add the security piece of information SEC and/or the privileged piece of information to each transaction emitted by a master piece of equipment if these two pieces of information do not already appear in the transaction emitted by the master piece of equipment.

Figure 15:
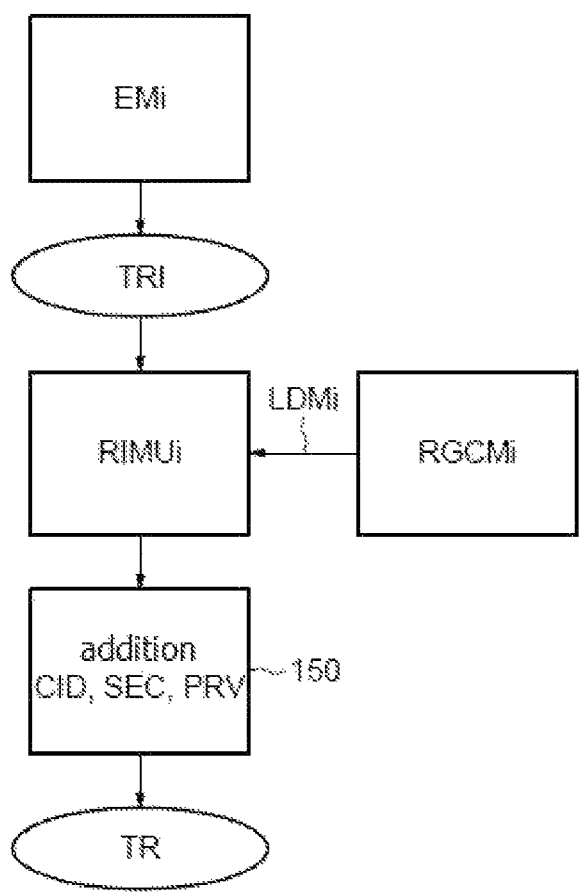
FIG. 15 illustrates addition means configured to add to each transaction emitted by a master piece of equipment the identification piece of information of the master piece of equipment.

As illustrated in FIG. 15, these addition means include for each master piece of equipment EMi, the associated elementary management unit RIMUi which is linked to the set of corresponding configuration registers RGCMi by the specific link LDMi.

Thus, the elementary management unit RIMUi completes the initial transaction TRI emitted by the master piece of equipment EMi by adding (step 150) the identification piece of information CID and optionally the information SEC and PRV thereto, the complete transaction TR then being supplied on the bus linked to the interconnection circuit INTC.

Materially, this elementary management unit RIMUi can comprise a logic circuit.

The processing means MT can also include verification means configured to verify whether a transaction TR emanating from a master piece of equipment and intended for a slave resource is authorized to access this slave resource using at least the configuration piece of information attached to the transaction, and in general at least some of the other configuration pieces of information of the set of configuration pieces of information assigned to this slave resource.

Figure 16:
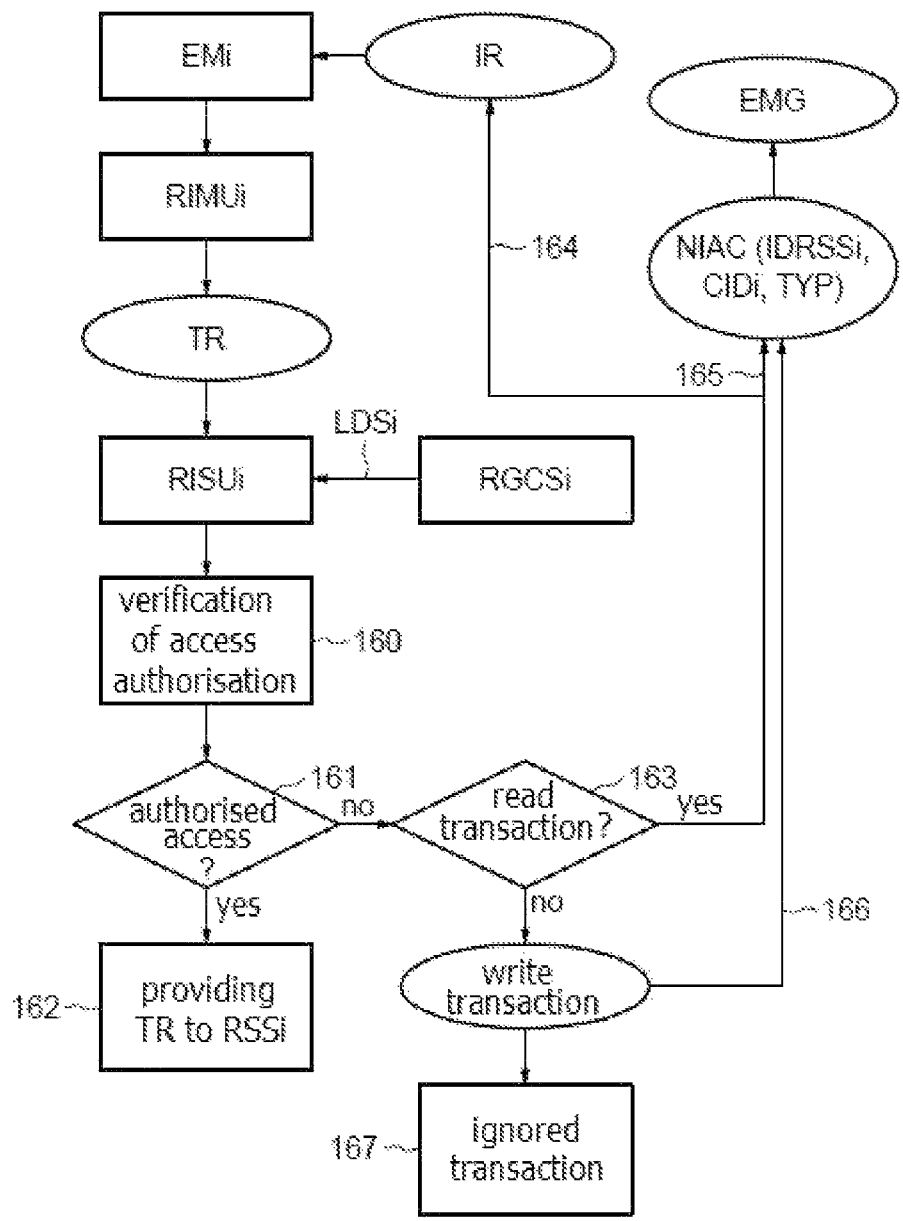
FIG. 16 illustrates verification means configured to perform the verification downstream of the interconnection circuit.

More specifically, as illustrated in FIG. 16, the verification means are configured to perform the verification downstream of the interconnection circuit INTC and these verification means include for each slave resource the elementary verification module RISUi which is configured to access the set of configuration pieces of information assigned to this slave resource and stored in the set of corresponding configuration registers RGCSi, via the specific link LDSi.

The access authorization verification is performed in step 160.

This verification allows to define whether in step 161 the access to the transaction TR intended for the slave resource RSSi is authorized or not.

This is for example the case if the filtering indication IFLT is enabled and the slave resource can only be accessed by one or more master pieces of equipment having the same identification piece of information, and the identification piece of information contained in the transaction TR does not correspond to the identification piece of information stored in the set of registers RGCSi.

The verification means then determine whether the denied transaction is a read transaction (step 163).

If this is the case, the elementary management unit RISUi returns to the master piece of equipment EMi emitting the denied transaction (step 164) an indication of access denial IR, for example a 0.

In parallel, the elementary verification module RISUi returns (step 165) to the master manager piece of equipment EMG an illegal access notification NIAC containing an identifier IDRSSi of the slave resource RSSi, the identification piece of information CIDi of the master piece of equipment EMI at the origin of this denied transaction, as well as the transaction type (here the read type).

If the denied transaction is a write transaction, then this transaction is purely and simply ignored (step 167) but the elementary verification module RISUi still returns to the master manager piece of equipment EMG the illegal access notification containing here again the identifier IDRSSi, the identification piece of information CIDi of the master piece of equipment EMI at the origin of the denied transaction and the type of the denied transaction, here the write type.

Structurally, an elementary verification module RISU can include a logic circuit.

It was seen previously that only the master manager piece of equipment can send a transaction to the configuration controller, for example to update configuration registers.

In this regard, it is therefore necessary to verify that a transaction arriving at the configuration controller is indeed emitted by the master manager piece of equipment.

Figure 17:
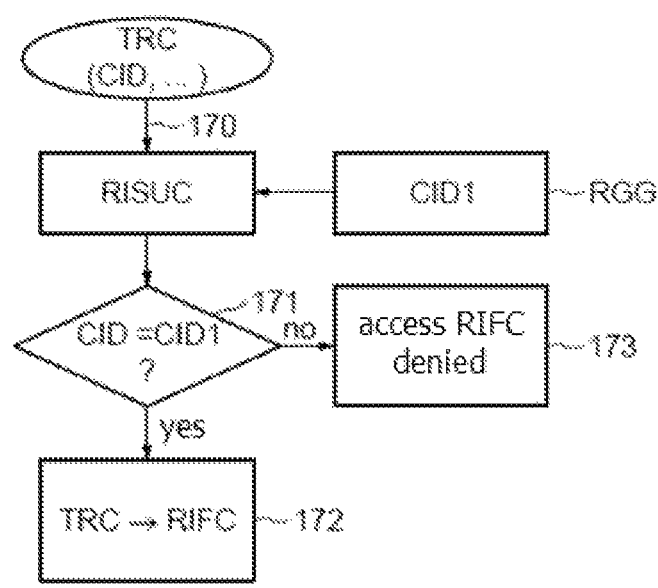
FIG. 17 illustrates an auxiliary verification module verifying that a transaction arriving at the configuration controller is emitted by the master manager piece of equipment.

This is the role of an auxiliary verification module RISUC assigned to the configuration controller RIFC (FIG. 17).

In this regard, when a transaction TRC, in particular containing the identification piece of information CID of the master piece of equipment at the origin of this transaction TRC, is provided (step 170) to the auxiliary verification module RISUC, the latter, connected to the manager register RGG containing the identification piece of information CID of the current manager equipment, for example the microprocessor CPU1, verifies that the identification piece of information CID contained in the transaction TRC indeed corresponds to the identification piece of information CID1 (step 171).

If this is not the case, the access to the controller RIFC is denied (step 173).

On the other hand, if there is a match between the two identification pieces of information, then the transaction TRC is indeed provided to the configuration controller RIFC (step 172).

It was seen previously that from the master pieces of equipment, it is possible that there is at least one master piece of equipment having a slave port and a master port.

Figure 18:
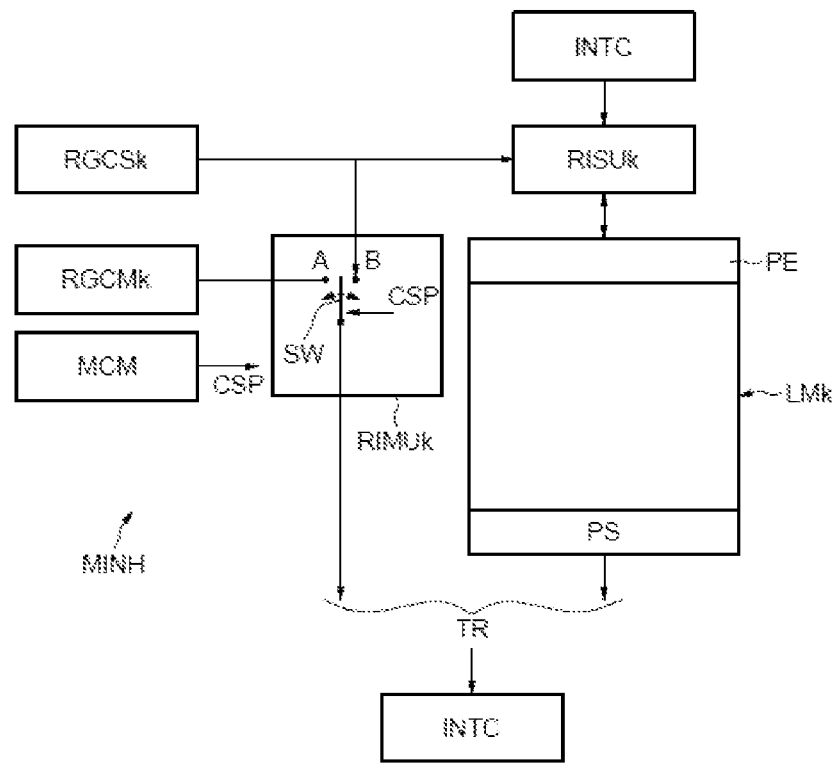
FIG. 18 illustrates a master piece of equipment having a slave port and a master port.

This is the case for example for the master piece of equipment LMk (FIG. 18) having an input port PE (slave port) and an output port PS (master port).

Such a master piece of equipment can for example be a USB controller which is controllable by a microprocessor but which can also be controllable during the execution of the user program, by another microprocessor.

Such a master piece of equipment can also be a direct memory access controller (DMA).

The slave port PE is associated with an elementary verification module RISUk connected to the corresponding set of configuration registers RGCSk and the master port PS is associated with an elementary management unit RIMUk connected to the corresponding set of configuration registers RGCMk but also to the set of configuration registers RGCSk.

It is initially assumed that this master piece of equipment LMk is controlled by the microprocessor CPU1.

In this case, the set of configuration registers RGCSk to which the elementary verification module RISUk is linked contains the identification piece of information CID1 of the microprocessor 1 as well as the privileged and security pieces of information corresponding to those of the microprocessor CPU1.

The set of registers RGCMk also includes the identification piece of information CID1 of the microprocessor CPU1 as well as the corresponding security and privileged pieces of information.

The processing means then include inheritance means MINH (FIG. 18) configured, upon control and by taking into account inheritance rules, to replace at least some of the configuration pieces of information assigned to the master port with the homologous configuration pieces of information assigned to the slave port or else to keep the configuration pieces of information assigned to the master port.

Thus, when another microprocessor takes control of such a master piece of equipment LMk, the inheritance means can allow, by a simple switching, and if the inheritance rules allow it, to confer to the master port configuration pieces of information of the slave port which correspond to those of the other microprocessor.

However, inheritance rules prohibit, for example, defining a port for a peripheral in secure mode if the master piece of equipment which controls it is not itself in secure mode.

More specifically, these inheritance means MINH include a set of controllable switches SW, produced for example in hardware form, selectively connected to the set of registers RGMk and to the set of registers RGCSk.

The inheritance means MINH also include MCM control means, for example produced in software form within the microprocessor CPU1, and capable of emitting a control signal CSP intended to control the switch set SW taking into account the inheritance rules.

As long as the master piece of equipment LMk is controlled by the microprocessor CPU1, the control means MCM place the switch SW in position A so as to add to the transaction emitted by the master port PS, the identification piece of information CID1 as well as the corresponding privileged and security pieces of information.

On the other hand, if at a given instant there is a modification of the configuration diagram so that it is for example the microprocessor CPU2 which must take control of the master piece of equipment LMk, then, there is
- on the one hand, an update of the set of configuration registers RGCSk with the new identification piece of information CID2 of the microprocessor CPU2 and with the corresponding privileged and security pieces of information and,
- on the other hand, a switching of the switch SW to position B so that, automatically, the identification piece of information CID2 of the microprocessor CPU2 and the corresponding security and privileged pieces of information are attached to the transaction emitted by the master port PS on the interconnection circuit INTC.

In other words, without it being necessary to perform a complete reprogramming of the system on a chip, there is an automatic inheritance by a simple switching, of the new information assigned to the slave port towards the master port.

Figure 19:
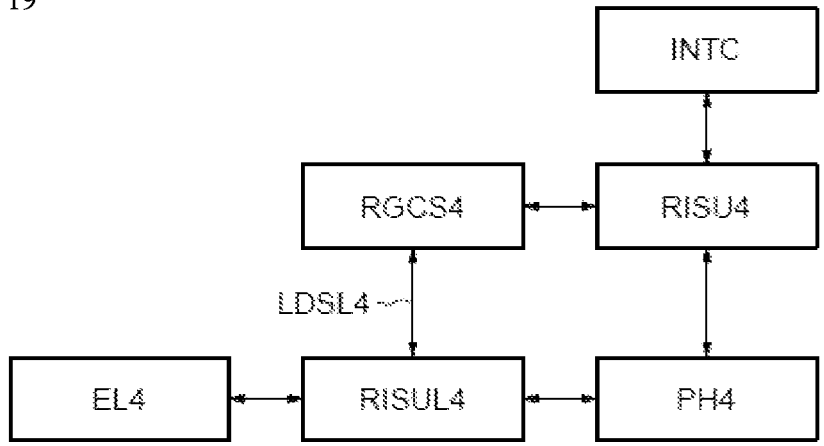
FIG. 19 illustrates verification means including for an element an elementary verification module configured to access the configuration pieces of information assigned to the associated peripheral.
Figure 20:
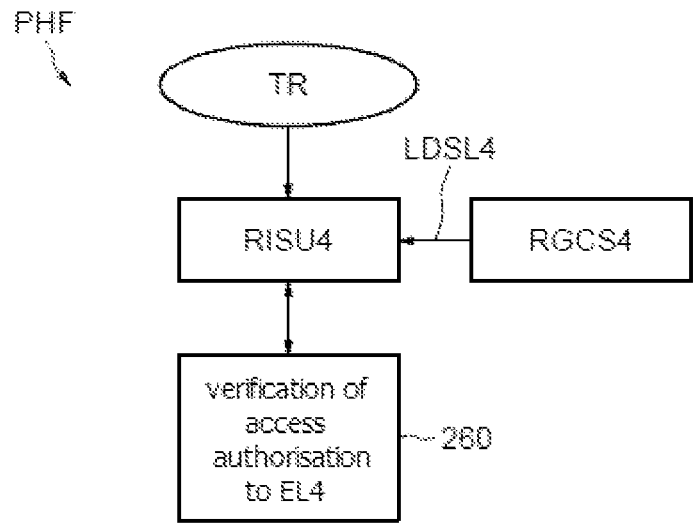
FIG. 20 illustrates a transaction intended for an element being analysed during the operating phase of the system on a chip.

Reference is now made more particularly to FIGS. 19 and 20 to describe the case of the first particular slave resource PH4 coupled to the element EL4 and cooperating therewith during the operation of the system on a chip MCU.

Of course, several elements of different nature could be coupled to the peripheral.

Each element can for example be a generator of at least one clock signal, a generator of at least a reset signal, a power block or at least one configurable input/output pin of the system on a chip.

This element is likely to receive a write-type transaction TR.

In the case of a clock signal generator, the transaction may for example include an indication aiming at modifying the frequency of the clock signal(s) or at stopping the generator.

In the case of a reset signal generator, the transaction may for example include an indication aiming at controlling the generator so that it effectively provides the reset signal.

In the case of a power block, the transaction may for example include an indication aiming at controlling the stop or start of the boot of the block.

In the case of a configurable input/output pin of the system on a chip, the transaction may for example aim at writing one or more bits in registers conventionally associated with a pin and intended to configure the (input, output) pin or its routing within the system on a chip.

As indicated above, the configuration pieces of information assigned to the element EL4 is identical to the configuration pieces of information assigned to the first particular slave resource PH4.

Thus, and more generally, all the resources or elements of the system on a chip used for example by a peripheral have the same access rights as the peripheral.

There is, in other words, an inheritance at each element of the configuration pieces of information assigned to the particular slave resource which is coupled thereto and with which it cooperates during the operation of the integrated circuit.

This unique configuration between a slave resource and the element(s) which are coupled thereto, thus simplifies the programming of the system on a chip, the debugging and ensures configuration consistency.

More specifically and as illustrated in FIG. 19, the verification means advantageously include for element EL4, an elementary verification module RISUL4, for example of structure similar to the elementary verification module RISU, and configured to access the configuration pieces of information assigned to the peripheral PH4.

In this regard, the elementary verification module RISUL4 is connected by a dedicated link LDSL4 to the set of configuration registers RGCS4 assigned to the peripheral PH4.

During the operating phase PHF of the system on a chip, a transaction TR intended for the element EL4 is analysed (FIG. 20) by the module RISUL4 using the configuration pieces of information contained in the transaction TR and those contained in the set of configuration registers RGCS4 assigned to the peripheral PH4.

This allows verifying in step 260 the access authorization of this transaction TR to the element EL4 and performing, for example, subsequently, steps similar to steps 161 to 167 of FIG. 16.

In FIG. 19, one or more elements cooperate with a single slave resource.

However, the system on a chip can include other slave resources, here called second particular slave resources, for example channels of a DMA controller, capable of being accessed by several master pieces of equipment, but sharing at least one same element.

Figure 21:
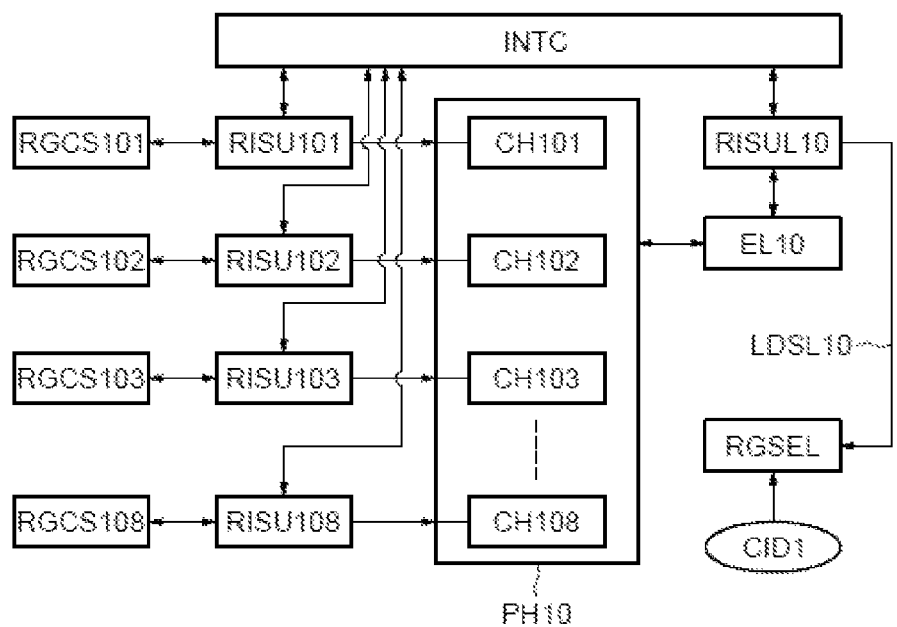
FIG. 21 illustrates a single reset signal generator being assigned to the DMA controller and therefore shared by all the DMA channels that are designated as second slave resources.

For example, as illustrated in FIG. 21, a single reset signal generator EL10 is assigned to the DMA controller and therefore shared by all the DMA channels CH101-CH108 which are here designated as the second particular slave resources.

Of course, other elements could be shared by all DMA channels.

The DMA channels CH101-CH108 are respectively assigned elementary verification modules RISU101-RISU108 respectively coupled to the corresponding configuration registers RGCS101-RGCS108.

And here at least two of the DMA channels are here capable of being accessed by different master pieces of equipment, for example the microprocessor CPU1, having the identification piece of information CID1, and the microprocessor CPU2, having the identification piece of information CID2.

And particularly for security reasons, it is highly preferable to select the one of the master pieces of equipment which will be able to have access to this generator, so as for example to prohibit master pieces of equipment having a lower degree of security, from controlling this generator EL10.

Thus, for example, it is desired that only the microprocessor can have access to the element EL10.

In this regard, it is advantageously provided that the processing means include selection means configured to select the master piece of equipment authorized to access this same element EL10.

The selection means here include at least one selection register RGSEL configured to store the identification piece of information CID1 of the master piece of equipment authorized to access this same element EL10.

The configuration controller RIFC is advantageously also configured to update the content of the RGSEL selection register(s).

The verification means include for the same element EL10 an elementary verification module RISUL10 configured to access the content of the selection register(s) RGSEL.

And the elementary verification module RISUL10 is advantageously connected to the selection register(s) RGSEL by a specific link LDSL10.

Figure 22:
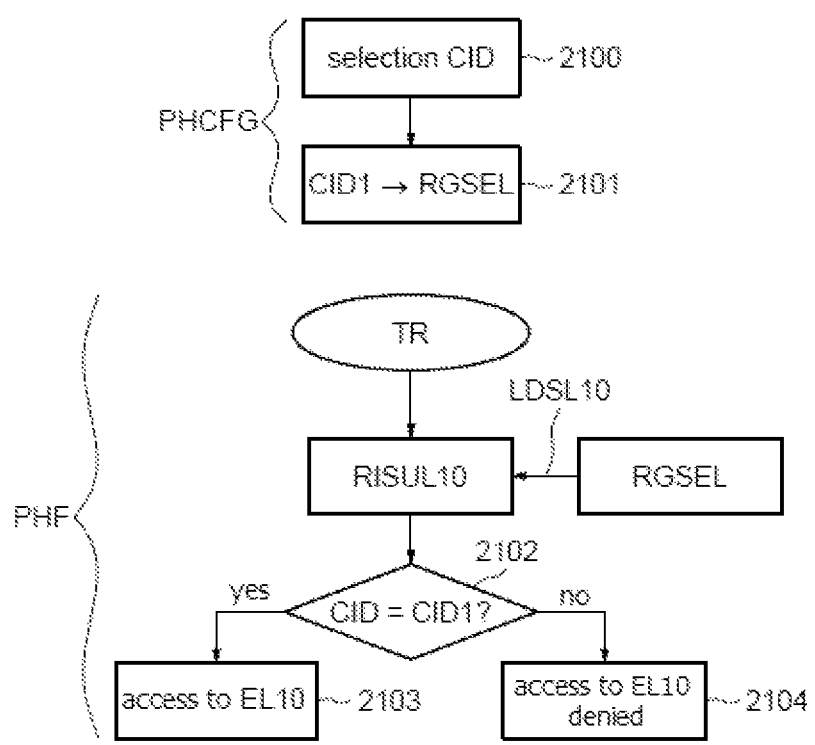
FIG. 22 illustrates verification means configured to verify during the operating phase whether a transaction emanating from a master piece of equipment and intended for an element is authorized to access that element.

As illustrated in FIG. 22, the verification means are advantageously also configured to verify during the operating phase PHF whether a transaction TR emanating from a master piece of equipment and intended for the same element EL10 is authorized to access this same element, using the at least one piece of configuration information attached to the transaction as well as the content of the selection register(s) RGSEL.

More specifically, during the configuration phase PHCFG, the master piece of equipment authorized to access the element EL10 is selected (step 2100) and its identification piece of information CID1 is stored in the register RGSEL.

It should be noted that this selection can be fixed and not modifiable or programmable.

In the operating phase PHF, the transaction TR is analysed by the module RISUL10 using the identification piece of information CID contained in the transaction TR and that, CID1, contained in the selection register RGSEL (step 2102).

In the event of a match, the access to the element EL10 is authorized (step 2103), otherwise access is denied (step 2104).

It should be noted that the present invention is compatible with the invention described in the French patent application filed on behalf of the companies STMicroelectronics (Alps) SAS and STMicroelectronics (Grand Ouest) SAS, on the same day as the present application and having the title "Method for managing the operation of a system on a chip, for example forming a microcontroller, and corresponding system on a chip."

Example embodiments of the present invention are summarized here. Other embodiments also can be understood from the entirety of the specification and the claims filed herein.

Example 1. A system on a chip, including several master pieces of equipment, several slave resources including a first particular slave resource (PH4) coupled to at least one element (EL4) of the system on a chip intended to cooperate with said first particular slave resource during the operation of the system on a chip, an interconnection circuit (INTC) coupled between the master pieces of equipment, the slave resources and said element(s) and capable of routing transactions between master pieces of equipment, slave resources and said element(s), and processing means (MT) at least configured to allow a user of the system on a chip to implement within the system on a chip (MCU) at least one configuration diagram (SCH) of this system defined by a set of configuration pieces of information assigned to the master pieces of equipment, to the slave resources as well as to said at least one element, the set of configuration pieces of information being used to define an assignment of at least one master piece of equipment to at least some of the slave resources, the configuration pieces of information assigned to said at least one element being identical to the configuration pieces of information assigned to said first particular slave resource.

Example 2. The system on a chip according to example 1, including several first particular slave resources coupled to several elements of the system on a chip (MCU).

Example 3. The system on a chip according to one of examples 1 or 2, where—a slave resource belongs to the group formed at least by a peripheral (PH3), a feature (PH60) of a peripheral (PH6), a memory means (IMM1) internal to the system on a chip, a memory interface (INTM2) internal to the system on a chip and intended to be coupled to a memory means (EXMM) external to the system on a chip.—at least one master piece of equipment (LMk) is controllable by a microprocessor and includes an output port (PS) capable of emitting transactions as well as an input port (PE) capable of receiving transactions, said input port being considered as a slave resource and the output port as a master piece of equipment,—a first particular slave resource belongs to the group formed by a peripheral, a feature of a peripheral, and an input port of a master piece of equipment controllable by a microprocessor, and—said at least one element (EL4) belongs to the group formed by a generator of at least one clock signal, a generator of at least one reset signal, a power block and at least one configurable input/output pin of the system on a chip.

Example 4. The system on a chip according to one of the preceding examples, including,—a set of configuration registers assigned to each slave resource and to each master piece of equipment, the set of configuration registers assigned to a slave resource being intended to store the various configuration pieces of information assigned to this slave resource, and—a configuration controller (RIFC) configured to update the contents of the sets of configuration registers with said set of configuration pieces of information under the control of a first master piece of equipment called master manager piece of equipment.

Example 5. The system on a chip according to one of the preceding examples, where at least one piece of configuration information is intended to be attached to each transaction, and the processing means (MT) include verification means (RISUL4) configured to verify whether a transaction emanating from a master piece of equipment and intended for an element coupled to a first particular slave resource is authorised to access this element, using said at least one piece of configuration information attached to said transaction as well as the configuration pieces of information assigned to this first particular slave resource.

Example 6. The system on a chip according to example 5, where the verification means are configured to perform said verification downstream of the interconnection circuit (INTC).

Example 7. The system on a chip according to one of example 5 or 6, where the verification means include for each slave resource, an elementary verification module (RISUi) configured to access the set of configuration pieces of information assigned to this slave resource and for each element (EL4), an elementary verification module (RISUL4) configured to access the configuration pieces of information assigned to the first corresponding particular slave resource.

Example 8. The system on a chip according to example 7, where each elementary verification module (RISUi) assigned to a slave resource is connected by a dedicated link (LDSi) to the set of configuration registers (RGCSi) assigned to this slave resource and each elementary verification module (RISUL4) assigned to an element is connected by a dedicated link (LDSL4) to the set of configuration registers (RGCS4) assigned to the first corresponding particular slave resource (PH4).

Example 9. The system on a chip according to one of the preceding examples, where said set of configuration pieces of information includes at least one identification piece of information (CID) assigned to each master piece of equipment.

Example 10. The system on a chip according to example 9, where the set of configuration pieces of information of the configuration diagram further includes, for at least one slave resource, an inaccessibility piece of information (INAC) intended to indicate that this slave resource is inaccessible by any master piece of equipment.

Example 11. The system on a chip according to one of examples 9 or 10, where the set of configuration pieces of information defining the configuration diagram further includes for each non-inaccessible slave resource, a filtering piece of information (IFLT) intended to indicate whether this slave resource can be accessed by any master piece of equipment or by only one or more master pieces of equipment.

Example 12. The system on a chip according to example 11, where the set of configuration pieces of information defining the configuration diagram further includes for each non-inaccessible slave resource,—a first access piece of information (IAC1) intended to indicate, in the case where the filtering piece of information indicates that the slave resource can be accessed by only one or more master pieces of equipment, that this slave resource can be accessed by one or more master pieces of equipment having the same identification piece of information, and—the corresponding identification piece of information (CID).

Example 13. The system on a chip according to example 12, where the set of configuration pieces of information defining the configuration diagram further includes for each non-inaccessible slave resource,—a second access piece of information (IAC2) intended to indicate, in the case where the filtering piece of information indicates that the slave resource can be accessed by only one or more master pieces of equipment, that this slave resource can be accessed by master pieces of equipment having different identification pieces of information, and—the list (CID1 . . . CID4) of identification pieces of information of the corresponding master pieces of equipment.

Example 14. The system on a chip according to example 13, where the set of configuration pieces of information defining the configuration diagram further includes for at least one of the slave resources that can be accessed by the master pieces of equipment of said list, a third piece of information (IAC3) intended to indicate the at least one of said slave resources can only be accessed by one master piece of equipment at a time, the master piece of equipment wishing to access this slave resource being configured to use a semaphore.

Example 15. The system on a chip according to one of examples 9 to 14, where the set of configuration pieces of information defining the configuration diagram further includes for each non-inaccessible slave resource, a security piece of information (ISEC) intended to indicate whether this slave resource is accessible by a master piece of equipment in secure mode or not.

Example 16. The system on a chip according to one of examples 9 to 15, where the set of configuration pieces of information defining the configuration diagram further includes, for each non-inaccessible slave resource, a privileged piece of information (IPRV) intended to indicate whether this slave resource is accessible by a master piece of equipment in privileged mode or not.

Example 17. The system on a chip according to one of the preceding examples, where the slave resources include several second particular slave resources (CH101-CH108) coupled at least to the same element (EL10) of the system on a chip, and capable of being accessed by several master pieces of equipment, and the processing means including selection means configured to select the master piece of equipment authorised to access said at least one same element.

Example 18. The system on a chip according to examples 9 and 17, where the selection means include at least one selection register (RGSEL) configured to store the identification piece of information (CID) of the master piece of equipment authorised to access said at least one same element.

Example 19. The system on a chip according to examples 4 and 18, where the configuration controller (RIFC) is also configured to update the content of the selection register(s).

Example 20. The system on a chip according to one of examples 18 or 19 as combined with example 5, where the verification means are also configured to verify whether a transaction emanating from a master piece of equipment and intended for said at least one same element is authorised to access this same element (EL10), using said at least one piece of configuration information attached to said transaction as well as the content of the selection register(s).

Example 21. The system on a chip according to example 20, where the verification means include for each same element an elementary verification module (RISUL10) configured to access the content of the selection register(s).

Example 22. The system on a chip according to example 21, where the elementary verification module is connected to the selection register(s) by a specific link (LDSL10).

Example 23. The system on a chip according to one of the preceding examples, forming a microcontroller (MCU) or a microprocessor.

Example 24. A method for managing the operation of a system on a chip, the system on a chip including several master pieces of equipment, several slave resources including a first particular slave resource coupled to at least one element of the system on a chip cooperating with said first particular slave resource during the operation of the system on a chip, an interconnection circuit coupled between the master pieces of equipment and the slave resources and said element(s) and capable of routing transactions between master pieces of equipment, slave resources and said element(s), the method including—a configuration phase (PHCFG) including defining at least one configuration diagram by a set of configuration pieces of information assigned to the master pieces of equipment, to the slave resources as well as to said at least one element, this set of configuration pieces of information allowing to define an assignment of at least one master piece of equipment to at least some of the slave resources, the configuration pieces of information assigned to said at least one element being identical to the configuration pieces of information assigned to said first particular slave resource, and implementing within the system on a chip said at least one configuration diagram, and—an operating phase (PHF) including addressing the slave resources without using the set of these configuration pieces of information.

Example 25. The method according to example 24, including coupling several first particular slave resources to several elements of the system on a chip.

Example 26. The method according to one of examples 24 or 25, where—a slave resource belongs to the group formed at least of a peripheral (PH3), a feature (PH60, PH61) of a peripheral (PH6), a memory means internal to the system on a chip, a memory interface internal to the system on a chip and intended to be coupled to a memory means external to the system on a chip.—at least one master piece of equipment (LMk) is controllable by a microprocessor and includes an output port (PS) capable of emitting transactions as well as an input port (PE) capable of receiving transactions, said input port being considered as a slave resource and the output port as a master piece of equipment,—a first particular slave resource belongs to the group formed by a peripheral, a feature of a peripheral, and an input port of a master piece of equipment controllable by a microprocessor, and—said at least one element belongs to the group formed by a generator of at least one clock signal, a generator of at least one reset signal, a power block and at least one configurable input/output pin of the system on a chip.

Example 27. The method according to one of examples 24 to 26, including updating the configuration pieces of information assigned to each slave resource and to each master piece of equipment, under the control of a first master piece of equipment called master manager piece of equipment (EMG).

Example 28. The method according to one of examples 24 to 27, where at least one piece of configuration information is attached to each transaction, and the operating phase (PHF) includes verifying whether a transaction emanating from a master piece of equipment and intended for an element (EL4) coupled to a first particular slave resource (PH4) is authorised to access this element, said verification including the use of said at least one piece of configuration information attached to said transaction as well as the configuration pieces of information assigned to this first particular slave resource.

Example 29. The method according to example 28, where said verification is performed downstream of the interconnection circuit (INTC).

Example 30. The method according to one of examples 28 to 29, where said verification includes local verifications (RISUi) performed at the slave resources from the configuration pieces of information respectively assigned to these slave resources, and at each element from the configuration pieces of information assigned to the first corresponding particular slave resource.

Example 31. The method according to one of examples 24 to 30, where said set of configuration pieces of information includes at least one identification piece of information (CID) assigned to each master piece of equipment.

Example 32. The method according to example 31, where the set of configuration pieces of information of the configuration diagram further includes, for at least one slave resource, an inaccessibility piece of information (INAC) indicating whether this slave resource is inaccessible by any master piece of equipment or not.

Example 33. The method according to one of examples 31 to 32, where the set of configuration pieces of information defining the configuration diagram further includes for each non-inaccessible slave resource, a filtering piece of information (IFLT) indicating whether this slave resource can be accessed by any master piece of equipment or by only one or more master pieces of equipment.

Example 34. The method according to example 33, where the set of configuration pieces of information defining the configuration diagram further includes for each non-inaccessible slave resource,—a first access piece of information (IAC1) indicating, in the case where the filtering piece of information indicates that the slave resource can be accessed by only one or more master pieces of equipment, that this slave resource can be accessed by one or more master pieces of equipment having the same identification piece of information, and—the corresponding identification piece of information.

Example 35. The method according to example 34, where the set of configuration pieces of information defining the configuration diagram further includes for each non-inaccessible slave resource,—a second access piece of information (IAC2) indicating, in the case where the filtering piece of information indicates that the slave resource can be accessed by only one or more master pieces of equipment, that this slave resource can be accessed by master pieces of equipment having different identification pieces of information, and—the list of identification pieces of information of the corresponding master pieces of equipment.

Example 36. The method according to example 35, where the set of configuration pieces of information defining the configuration diagram further includes for at least one of the slave resources that can be accessed by the master pieces of equipment of said list, a third piece of information (IAC3) indicating that at least one of said slave resources can only be accessed by one master piece of equipment at a time, the master piece of equipment wishing to access this slave resource during the operating phase using a semaphore (SMP).

Example 37. The method according to one of examples 31 to 36, where the set of configuration pieces of information defining the configuration diagram further includes for each non-inaccessible slave resource, a security piece of information (ISEC) indicating whether this slave resource is accessible by a master piece of equipment in secure mode or not.

Example 38. The method according to one of examples 31 to 37, where the set of configuration pieces of information defining the configuration diagram further includes for each non-inaccessible slave resource, a privileged piece of information (IPRV) indicating whether this slave resource is accessible by a master piece of equipment in privileged mode or not.

Example 39. The method according to one of examples 24 to 38, where the slave resources include several second particular slave resources (CH101-CH108) coupled at least to the same element (EL10) of the system on a chip, and capable of being accessed by several master pieces of equipment, and the configuration phase includes a selection of the master piece of equipment authorised to access said at least one same element.

Example 40. The method according to examples 31 and 39, including storing the identification piece of information (CID1) of the master piece of equipment authorised to access said at least one same element.

Example 41. The method according to one of examples 39 or 40 as combined with example 28, where said verification also includes additionally verifying that a transaction emanating from a master piece of equipment and intended for said at least one same element is authorised to access this same element, using said at least one piece of configuration information attached to said transaction as well as the identification piece of information (CID1) of the master piece of equipment authorised to access said at least one same element.

Example 42. The method according to example 41, where said additional verification is performed locally at each same element (EL10).

Example 43. The method according to one of examples 24 to 42, where the system on a chip forms a microcontroller (MCU) or a microprocessor.

What is claimed is:

1. A system on a chip, comprising:
   a plurality of master pieces of equipment on the system on a chip;
   a plurality of slave resources, on the system on a chip, including a first particular slave resource coupled to at least one element of the system on a chip intended to cooperate with the first particular slave resource during an operation of the system on a chip;
   an interconnection circuit, on the system on a chip, coupled between the master pieces of equipment, the slave resources and the at least one element, the interconnection circuit configured to route transactions between the master pieces of equipment, the slave resources and the at least one element;
   a processing circuit, on the system on a chip, configured to allow a user of the system on a chip to implement within the system on a chip at least one configuration diagram of the system as defined by a set of configuration pieces of information assigned to the master pieces of equipment, to the slave resources, and to the at least one element; and
   a set of configuration registers assigned to each slave resource and to each master piece of equipment, the set of configuration registers assigned to a slave resource being intended to store the configuration pieces of information assigned to the slave resource;
   wherein the set of configuration pieces of information are configured to be used to define an assignment of at least one master piece of equipment to at least some of the slave resources;
   wherein the configuration pieces of information assigned to the at least one element are identical to the configuration pieces of information assigned to the first particular slave resources;
   wherein at least one piece of configuration information is intended to be attached to each transaction, and the processing circuit includes a verification module configured to verify whether a transaction emanating from a master piece of equipment and intended for an element coupled to the first particular slave resource is authorized to access the element, using the at least one piece of configuration information attached to the transaction as well as the configuration pieces of information assigned to the first particular slave resource;
   wherein the verification module includes, for each slave resource, a first elementary verification module configured to access the set of configuration pieces of information assigned to the slave resource and, for each element, a second elementary verification module configured to access the configuration pieces of information assigned to the corresponding first particular slave resource; and
   wherein each first elementary verification module assigned to a slave resource is connected by a first dedicated link to the set of configuration registers assigned to the slave resource and each second elementary verification module assigned to an element is connected by a second dedicated link to the set of configuration registers assigned to the corresponding first particular slave resource.

2. The system on a chip according to claim 1, comprising a plurality of first particular slave resources coupled to a plurality of elements of the system on a chip.

3. The system on a chip according to claim 1, wherein:
   each slave resource belongs to a first group formed at least by a peripheral, a feature of the peripheral, a first memory internal to the system on a chip, and a memory interface internal to the system on a chip and intended to be coupled to a second memory external to the system on a chip;
   at least one master piece of equipment is controllable by a microprocessor and includes an output port configured to emit first transactions as well as an input port configured to receive second transactions, the input port being considered as a slave resource and the output port as a master piece of equipment; and
   the first particular slave resource belongs to a second group formed by the peripheral, the feature of the peripheral, and the input port of the master piece of equipment controllable by the microprocessor; and
   the at least one element is selected from a generator of at least one clock signal, a generator of at least one reset signal, a power block, or at least one configurable input/output pin of the system on a chip.

4. The system on a chip according to claim 1, comprising, a configuration controller configured to update contents of the sets of configuration registers with the set of configuration pieces of information under control of a first master piece of equipment called master manager piece of equipment.

5. The system on a chip according to claim 1, wherein the verification module is configured to perform the verification downstream of the interconnection circuit.

6. The system on a chip according to claim 1, wherein the set of configuration pieces of information comprises at least one identification piece of information assigned to each master piece of equipment.

7. The system on a chip according to claim 1, wherein the system on a chip is a microcontroller or a microprocessor.

8. A system on a chip, comprising:
   a plurality of master pieces of equipment on the system on a chip;
   a plurality of slave resources, on the system on a chip, including a first particular slave resource coupled to at least one element of the system on a chip intended to cooperate with the first particular slave resource during an operation of the system on a chip;
   an interconnection circuit, on the system on a chip, coupled between the master pieces of equipment, the slave resources and the at least one element, the interconnection circuit configured to route transactions between the master pieces of equipment, the slave resources and the at least one element; and a processing circuit, on the system on a chip, configured to allow a user of the system on a chip to implement within the system on a chip at least one configuration diagram of the system as defined by a set of configuration pieces of information assigned to the master pieces of equipment, to the slave resources, and to the at least one element;

wherein the set of configuration pieces of information are configured to be used to define an assignment of at least one master piece of equipment to at least some of the slave resources; wherein the configuration pieces of information assigned to the at least one element are identical to the configuration pieces of information assigned to the first particular slave resource;

wherein the set of configuration pieces of information comprises at least one identification piece of information assigned to each master piece of equipment; and wherein the set of configuration pieces of information of the configuration diagram further comprises, for at least one slave resource, an inaccessibility piece of information intended to indicate that the slave resource is inaccessible by any master piece of equipment.

9. The system on a chip according to claim 8, comprising a plurality of first particular slave resources coupled to a plurality of elements of the system on a chip.

10. The system on a chip according to claim 8, wherein:
each slave resource belongs to a first group formed at least by a peripheral, a feature of the peripheral, a first memory internal to the system on a chip, and a memory interface internal to the system on a chip and intended to be coupled to a second memory external to the system on a chip;

at least one master piece of equipment is controllable by a microprocessor and includes an output port configured to emit first transactions as well as an input port configured to receive second transactions, the input port being considered as a slave resource and the output port as a master piece of equipment; and the first particular slave resource belongs to a second group formed by the peripheral, the feature of the peripheral, and the input port of the master piece of equipment controllable by the microprocessor; and the at least one element is selected from a generator of at least one clock signal, a generator of at least one reset signal, a power block, or at least one configurable input/output pin of the system on a chip.

11. The system on a chip according to claim 8, comprising,
a set of configuration registers assigned to each slave resource and to each master piece of equipment, the set of configuration registers assigned to a slave resource being intended to store the configuration pieces of information assigned to the slave resource; and a configuration controller configured to update contents of the sets of configuration registers with the set of configuration pieces of information under control of a first master piece of equipment called master manager piece of equipment.

12. The system on a chip according to claim 8, wherein the set of configuration pieces of information defining the configuration diagram further comprises, for each non-inaccessible slave resource, a filtering piece of information intended to indicate whether the non-inaccessible slave resource can be accessed by any master piece of equipment or by only one or more master pieces of equipment.

13. The system on a chip according to claim 8, wherein the set of configuration pieces of information defining the configuration diagram further comprises, for each non-inaccessible slave resource, a security piece of information intended to indicate whether the non-inaccessible slave resource is accessible by a master piece of equipment in secure mode or not.

14. The system on a chip according to claim 8, wherein the set of configuration pieces of information defining the configuration diagram further comprises, for each non-inaccessible slave resource, a privileged piece of information intended to indicate whether the non-inaccessible slave resource is accessible by a master piece of equipment in privileged mode or not.

15. The system on a chip according to claim 8, wherein the slave resources include a plurality of second particular slave resources coupled to at least one same element of the system on a chip, and configured to be accessed by the master pieces of equipment, and the processing circuit includes a selection module configured to select the master piece of equipment authorized to access the at least one same element.

16. The system on a chip according to claim 15, wherein the selection module includes at least one selection register configured to store the identification piece of information of the master piece of equipment authorized to access the at least one same element.

17. The system on a chip according to claim 16, comprising:
a set of configuration registers assigned to each slave resource and to each master piece of equipment, the set of configuration registers assigned to a slave resource being intended to store the configuration pieces of information assigned to the slave resource; and a configuration controller configured to update contents of the sets of configuration registers with the set of configuration pieces of information under control of a first master piece of equipment called master manager piece of equipment;

wherein the configuration controller is also configured to update a content of the at least one selection register.

18. The system on a chip according to claim 16, comprising:
wherein at least one piece of configuration information is intended to be attached to each transaction, and the processing circuit includes a verification module configured to:
verify whether a first transaction emanating from a master piece of equipment and intended for an element coupled to the first particular slave resource is authorized to access the element, using the at least one piece of configuration information attached to the transaction as well as the configuration pieces of information assigned to the first particular slave resource; and verify whether a second transaction emanating from the master piece of equipment and intended for the at least one same element is authorized to access the same element, using the at least one piece of configuration information attached to the transaction as well as a content of the at least one selection register.

19. The system on a chip according to claim 18, wherein the verification module includes, for each same element an elementary verification module configured to access the content of the at least one selection register.

20. The system on a chip according to claim 19, wherein the elementary verification module is connected to the at least one selection register by a specific link.

* * * * *

UNITED STATES PATENT AND TRADEMARK OFFICE
CERTIFICATE OF CORRECTION

PATENT NO. : 11,876,732 B2
APPLICATION NO. : 17/100505
DATED : January 16, 2024
INVENTOR(S) : Olson et al.

It is certified that error appears in the above-identified patent and that said Letters Patent is hereby corrected as shown below:

On the Title Page

Item [72], delete "Marseilles" and insert -- Marseille --.

Signed and Sealed this
Second Day of July, 2024

Katherine Kelly Vidal
*Director of the United States Patent and Trademark Office*